(12) United States Patent
Guerin et al.

(10) Patent No.: US 8,143,585 B2
(45) Date of Patent: *Mar. 27, 2012

(54) GAMMA-CAMERA UTILIZING THE INTERACTION DEPTH IN A DETECTOR

(75) Inventors: Lucie Guerin, Seyssinet Pariset (FR); Veronique Rebuffel, Corenc (FR); Loick Verger, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,423

(22) Filed: Jul. 6, 2011

(65) Prior Publication Data
US 2011/0260072 A1    Oct. 27, 2011

Related U.S. Application Data

(62) Division of application No. 12/446,064, filed as application No. PCT/FR2006/002360 on Oct. 20, 2006, now Pat. No. 8,013,308.

(51) Int. Cl.
H01L 27/146    (2006.01)
(52) U.S. Cl. .................................. 250/370.09
(58) Field of Classification Search ..... 250/370.01–370.15, 367, 363.01–363.1, 250/369, 366; 600/407, 436; 378/98.8
See application file for complete search history.

(56) References Cited

U.S. PATENT DOCUMENTS

| H12 H | * | 1/1986 | Bennett et al. | 250/363.09 |
|---|---|---|---|---|
| 5,448,073 A | | 9/1995 | Jeanguillaume | |
| 5,813,983 A | | 9/1998 | Difilippo et al. | |
| 5,854,489 A | | 12/1998 | Verger et al. | |
| 6,124,595 A | | 9/2000 | Engdahl et al. | |
| 6,194,728 B1 | | 2/2001 | Bosnjakovic | |
| 6,329,651 B1 | | 12/2001 | Mestais et al. | |
| 6,333,504 B1 | | 12/2001 | Lingren et al. | |

(Continued)

FOREIGN PATENT DOCUMENTS
EP    0763751 A1    3/1997
(Continued)

OTHER PUBLICATIONS

Williams, M. B. et al., "Investigation of Efficiency and Spatial Resolution Using Pinholes With Small Pinhole Angle," IEEE Transactions on Nuclear Science, vol. 50, No. 5, Oct. 2003, pp. 1562-1568.

(Continued)

*Primary Examiner* — Kiho Kim
(74) *Attorney, Agent, or Firm* — Nixon Peabody LLP

(57) ABSTRACT

A method for underwater packaging of radioactive materials includes creating a vacuum in a cavity of a cleaning device to automatically cause a portion of the cleaning device to move upward to actuate the cleaning device from an open position to a closed position; mounting the cleaning device inside a safe containment area of a transportation and/or storage device; placing the transportation and/or storage device in a pool after filling the safe containment area with water; loading a radioactive material into the safe containment area; closing the transportation and/or storage device using at least one cover; extracting the transportation and/or storage device from the pool; draining the water inside the safe containment area; and creating a pressure differential in the safe containment area to dry the safe containment area, wherein the pressure differential causes the cleaning device to automatically actuate from the closed position to the open position.

16 Claims, 23 Drawing Sheets

U.S. PATENT DOCUMENTS

| | | | |
|---|---|---|---|
| 6,342,699 | B1 | 1/2002 | Jeanguillaume |
| 6,448,559 | B1 | 9/2002 | Saoudi et al. |
| 6,455,856 | B1 | 9/2002 | Gagnon |
| 8,013,308 | B2 | 9/2011 | Guerin |
| 2002/0082492 | A1* | 6/2002 | Grzeszczuk .............. 600/407 |
| 2004/0015075 | A1 | 1/2004 | Kimchy et al. |
| 2004/0026624 | A1 | 2/2004 | Wainer et al. |
| 2004/0204646 | A1 | 10/2004 | Nagler et al. |
| 2005/0029461 | A1 | 2/2005 | Malmin |
| 2005/0139775 | A1 | 6/2005 | Gono et al. |

FOREIGN PATENT DOCUMENTS

| | | |
|---|---|---|
| EP | 1548465 A1 | 6/2005 |
| FR | 2673728 A1 | 9/1992 |
| FR | 2778467 A1 | 11/1999 |
| FR | 2790560 A1 | 9/2000 |
| JP | 6337289 A | 12/1994 |
| JP | 2000-056023 A | 2/2000 |
| JP | 2005-043062 A | 2/2005 |
| JP | 2005-208057 A | 8/2005 |

OTHER PUBLICATIONS

Japanese Office Action in Japanese Application No. 2009-532835, dated Jul. 23, 2011.

Beekman, F. J. et al., "Design and Simulation of a High-Resolution Stationary SPECT System for Small Animals," Institute of Physics Publishing, Phys. Med. Biol., vol. 49, 2004, pp. 4579-4592.

Beekman, F. J. et al., "Design and Simulation of U-SPECT, an Ultra-High Resolution Molecular Imaging System," Image Sciences Institute, University Medical Center Utrecht, Heidelberglaan, The Netherlands, IEEE, 2003, pp. 792-796.

Bruyant, P. P., "Analytic and Iterative Reconstruction Algorithms in SPECT," The Journal of Nuclear Medicine, vol. 43, No. 10, Oct. 2002, pp. 1343-1358.

Gagnon, D. et al., "Design Considerations for a New Solid-State Gamma-Camera: SOLSTICE," Nuclear Science Symposium Conference Record, IEEE Publication, vol. 2, Aug. 7, 2002, pp. 1156-1160.

Gros d-Aillon, E. et al., "Simulation and Experimental Results on Monolithic CdZnTe Gamma-Ray Detectors," IEEE Transactions on Nuclear Science, vol. 52, No. 6, Dec. 2005, pp. 3096-3102.

Shao, Y. et al., "Dual APD Array Readout of LSO Crystals: Optimization of Crystal Surface Treatment," IEEE Transactions on Nuclear Science, vol. 49, No. 3, Jun. 2002, pp. 649-654.

Vandenberghe, S. et al., "Iterative Reconstruction Algorithms in Nuclear Medicine," Computerized Medical Imaging and Graphics, Elsevier UK, vol. 25, No. 2, 2001, pp. 105-111.

Zeng, G. L. et al., "A Sparse Collimator for a Rotating Strip SPECT Camera," Nuclear Science Symposium Conference Record, IEEE Publication, vol. 5, Oct. 29, 2003, pp. 3257-3261.

Guillemaud, R. et al., "Sindbad: A Multi-Purpose and Scalable X-Ray Simulation Tool for NDE and Medical Imaging," CEA-LETI/DRT, CEA Grenoble, France, 2003, 4 pages.

International Search Report and Written Opinion in International Application No. PCT/FR2006/002360, mailed Jul. 19, 2007.

Office Action in U.S. Appl. No. 12/446,064, mailed Sep. 8, 2010.

\* cited by examiner

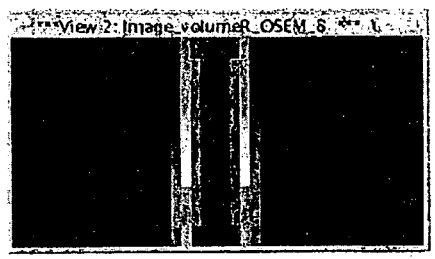
FIG. 18A
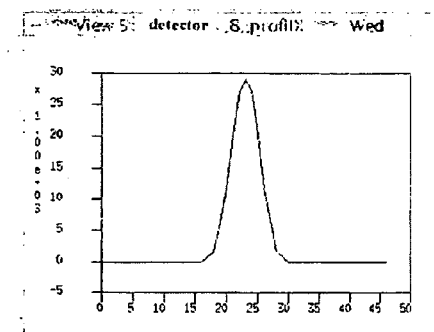
FIG. 18B
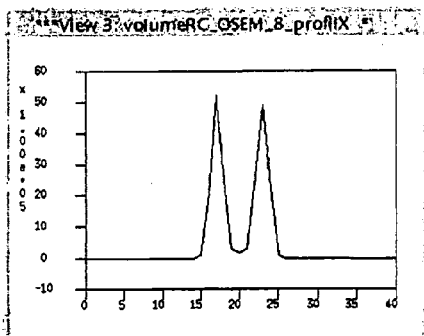
FIG. 18C
FIG. 18D
FIG. 19A
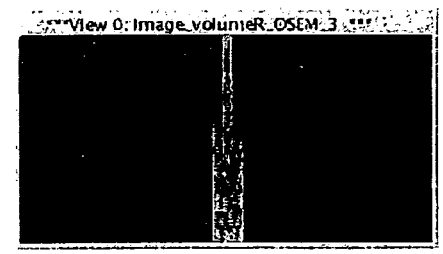
FIG. 18E
FIG. 19B

GAMMA-CAMERA UTILIZING THE INTERACTION DEPTH IN A DETECTOR

STATEMENT OF RELATED APPLICATIONS

The present application is a divisional of co-pending U.S. patent application Ser. No. 12/446,064, filed May 12, 2009, which is a national phase of International Application No. PCT/FR2006/002360, entitled "GAMMA-CAMERA USING THE DEPTH OF INTERACTION IN A DETECTOR", which was filed on Oct. 20, 2006.

DESCRIPTION

Technical Field and Prior Art

The invention relates to the field of gamma-cameras used in nuclear medicine.

A detector example used in this kind of camera is a NaI(T1) scintillator.

Presently, nuclear medicine services essentially use Anger type cameras, so-called conventional cameras, where the detector of gamma radiations consist of such a NaI(T1) scintillator. A collimator is placed in front of this scintillator so as to select the photons arriving on the detector. The most widespread collimator is the orthogonal collimator with hexagonal parallel holes (honeycomb), imposing a compromise between spatial resolution and efficiency of the system.

The images thereby obtained by this conventional camera provide poor performances (a compromise between 100 mm spatial resolution for a 140 keV source at 10 cm from the collimator; and $10^{-4}$ efficiency for a 140 keV source at 10 cm from the collimator; with further poor contrast of the image).

With the emergence of detectors based on a semiconductor, such as CdTe, CdZnTe (CZT) or further silicon, a new generation of gamma cameras may be contemplated.

The CZT detector may thus be combined with a collimator with square holes, with a hole of the collimator corresponding to a pixel of the detector.

With this system it is possible to reach the same compromise between spatial resolution Rs and efficiency as for conventional cameras.

Further, with this camera, it is possible to improve the contrast of the image by an energy resolution of the CZT detector of 4.6% at 140 keV, versus 10% for the NaI(T1) scintillator.

From now on, the problem of improving the performances of these devices, is posed both as regards the flux of detected photons, i.e. the efficiency (limited because of the presence of the collimator), and the spatial resolution which may be attained.

It is sought to improve the spatial resolution-efficiency compromise for these systems or improve their efficiency while improving or maintaining the present spatial resolution, or improve their spatial resolution while improving or maintaining the present efficiency.

According to another aspect, it is possible to obtain with a gamma camera, two types of images: images of the planar type, corresponding to an acquisition under a single viewing angle, and images of the tomographic type, corresponding to several acquisitions obtained under several viewing angles.

With conventional gamma cameras, tomographic images are obtained by means of reconstruction methods, unlike planar images, which do not require them.

The reconstruction methods used for tomographic acquisitions conventionally are analytical or iterative methods.

DISCUSSION OF THE INVENTION

According to the invention, in the applied reconstruction method, the interaction depth on the photons in the detector relative to the entry face of the latter is taken into account. This interaction depth is called DOI hereafter with reference to the acronym <<Depth of Interaction>>.

A determination of interaction depth is therefore combined with a reconstruction method, which results in an improvement in the spatial resolution and/or the efficiency of the gamma cameras.

The invention first relates to a method for reconstructing an image of a source of photons from interactions of photons emitted by this source with a detector of a gamma camera, positioned behind a collimator, including the following steps:
  associating with each photon interaction with the detector,
    a piece of information relating to the depth in the detector, of this interaction,
  reconstructing an image of the source of photons from said depth information in the detector.

With the invention it is possible to improve the compromise between spatial resolution and efficiency of the system.

According to an embodiment of the aforementioned method, in a preliminary step, the detector is broken down into several pixels, and each pixel into several superposed voxels. During the reconstruction, for each received photon, the voxel of the detector is then determined, in which the photon has interacted, and then for each voxel of the detector, the number of photons having interacted in this voxel is counted and finally for each voxel of the detector, a raw or differential statistical datum is defined, a raw datum corresponding to the number of counted photons for the relevant voxel, a differential datum corresponding to a difference between numbers of counted photons for different voxels. A reconstruction algorithm is then implemented using the statistical data collected beforehand.

The reconstruction may be carried out according to an algebraic iterative method, for example according to a method of the ART or SART type.

It may be carried out according to a statistical iterative method, for example a method of the MLEM or OSEM or MAP type or a regularization method.

With the present invention it is possible to reconstruct images of the planar or tomographic type.

According to one embodiment, the interaction areas in the detector are notionally distributed in n interaction layers of identical or different thicknesses, an interaction depth being associated with each layer. One of the layers of the detector and the corresponding depth are associated with each interaction. A monolithic detector or a detector consisting of n stacked detecting layers may be used, each layer defining an interaction depth.

In order to even further increase the performances of the processing, the interaction volume of each portion of the detector, located in the extension of each hole of the collimator, may be separated into at least two pixels. Resolution is thereby increased, and therefore the accuracy of the system.

The invention also relates to a device for reconstructing the image of a source of photons from interactions of photons, emitted by this source, with a detector of a gamma camera, this device including:

means for associating with each interaction of photon, emitted by a source of photons, with the detector, a piece of information relating to the depth in the detector, of this interaction, and means for reconstructing an image of the source of photons from said depth information.

The invention also relates to an imaging device including a radiation detector, a collimator positioned in front of the detector, and a device for reconstructing images as described above.

The fact of determining for each interaction in the detector a depth of interaction (DOI) enables an increase in the number of pieces of information available for each interaction, in particular those relating to the path of the photons(s) having given rise to the interaction.

The present invention allows the angular aperture to be increased by reducing the height of the septas of the collimator, and/or by increasing the size of the holes of the collimator. The efficiency of the system is thereby increased while maintaining or improving the accuracy of the localization (Rs). By increasing the angular aperture of the holes, more photons may be captured in each hole.

The information on the localization of the interaction of each photon in the detector is used during the reconstruction (inverse problem solution) in order to return to the distribution of the sources in the object.

The information on the localization in the depth of the detector significantly contributes to increasing the accuracy characteristics of the system.

For the reconstruction part, it is possible to start with each of the electric signals measured at the terminals of the detector or with raw or differential statistical data such as those specified above.

With the invention, by using the information relating to the interaction depth in the reconstruction techniques, it is possible to improve the spatial resolution as compared with known devices of the Anger camera type.

According to the invention, a reconstruction is carried out both on the images acquired in a planar mode and on the images acquired in a tomographic mode.

SHORT DESCRIPTION OF THE DRAWINGS

FIGS. 15A-15E, 16A-16E, 17A-17E, and 18A-18E represent the number of interactions in the detector and the profile of the detector as well as the reconstructed image and the profile of the reconstructed image, with a single layer detector on the one hand (FIGS. 15A-15E and FIGS. 17A-17E) and a multilayer detector on the other hand (FIGS. 16A-16E and FIGS. 18A-18E), and with, in each case, two point-like sources separated by 9.5 mm for FIGS. 15A-15E, 16A-16E and by 3.5 mm for FIGS. 17A-17E, and 18A-18E.

FIGS. 19A-19D, 20A-20D, 21A-21D, 22A-22D, 23A-23D and 24A-24D illustrate the number of interactions in the detector and the profile of the detector as well as the reconstructed image and the profile of the reconstructed image, with a single layer detector on the one hand (FIGS. 19A-19D, 21A-21D, 23A-23D) and a multilayer detector on the other hand (FIGS. 20A-20D, 22A-22D, 24A-24D), and with, in each case, a single point-like source and a collimator with 3 different hole diameters.

Figure 25:
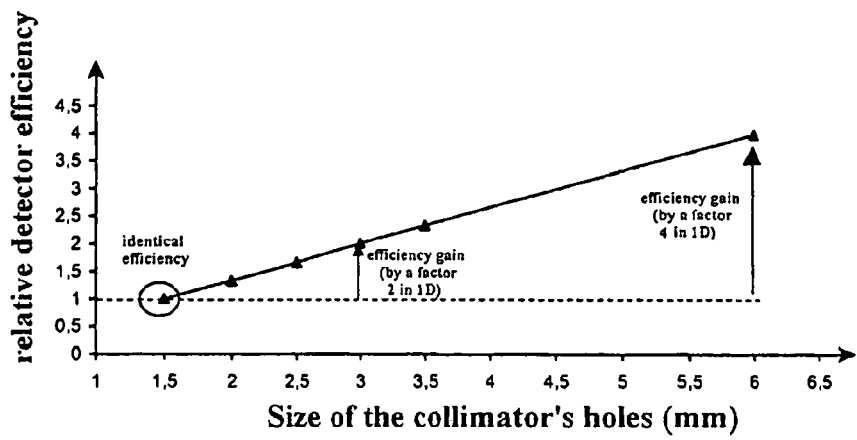
Figure 26:
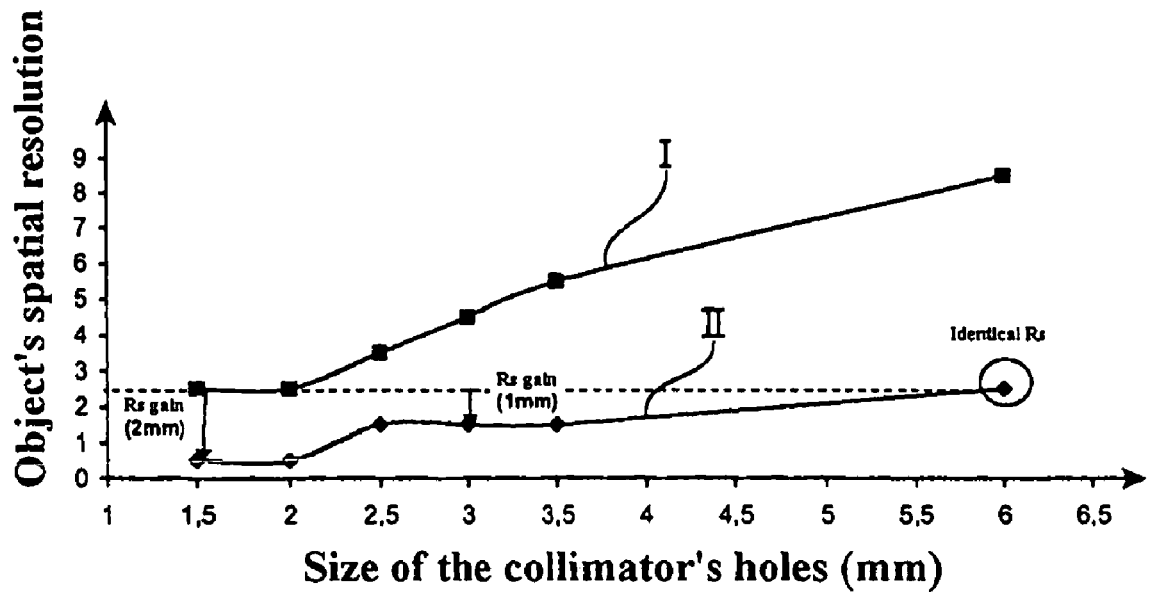
Figure 27:
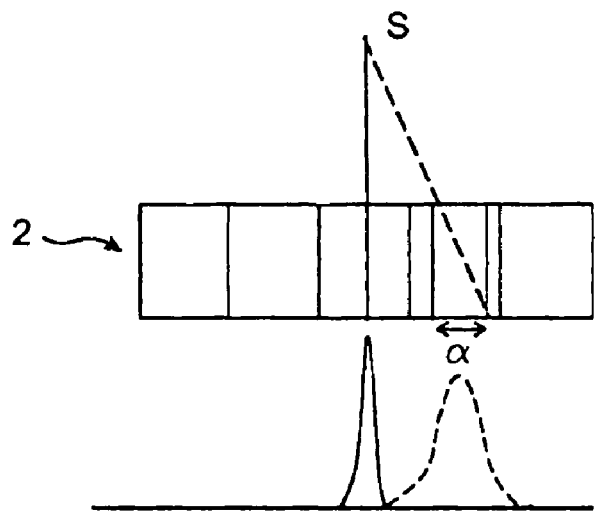

FIGS. 25 and 26 illustrate the change versus the dimension of the holes of the collimator, in the relative efficiency of a detector and in the spatial resolution of an object. FIG. 27 illustrates the effect of the penetration of radiation under an oblique angle into a detector.

DETAILED DISCUSSION OF PARTICULAR EMBODIMENTS

Figure 1A:
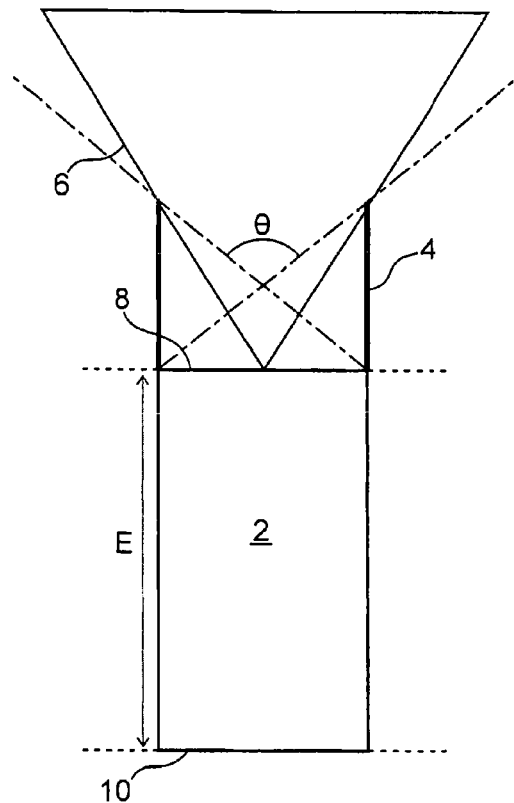
FIGS. 1A and 1B illustrate a detector and its collimator, as well as various depths and various detection aperture cones associated with these depths, within the scope of a method according to the invention.

FIG. 1A illustrates a detector 2 intended to be for example used as a gamma camera, in a planar or tomographic mode. This detector is for example of the CZT type, with depth or thickness E (E=5 mm in the considered example). The detector is associated with a collimator 4, for example with square parallel holes. In FIG. 1A, only one hole of the collimator and one detector pixel are visible. The broken lines in the extension of the upper 8 and lower 10 faces symbolize the other detector pixels and the other holes of the collimator not shown. With each of these upper and lower faces 8, 10, are also associated at least one cathode and at least one anode.

A detection aperture cone 6 very schematically illustrates the aperture of the collimator for a given point of the entry face of the detector. The more realistic aperture of the collimator is identified by dotted lines in FIG. 1A, with a maximum aperture illustrated by the angle θ.

According to the invention, depending on the geometrical dimensions of the detector 2 used, and along a direction parallel to the axis of the collimator 4, and taking into account the accuracy p which may be reached for the depth localization (or DOI) of a photon in the detector, it is possible to artificially distinguish in the detector, slices, each of which has a thickness at least equal to the accuracy p.

Figure 1B:
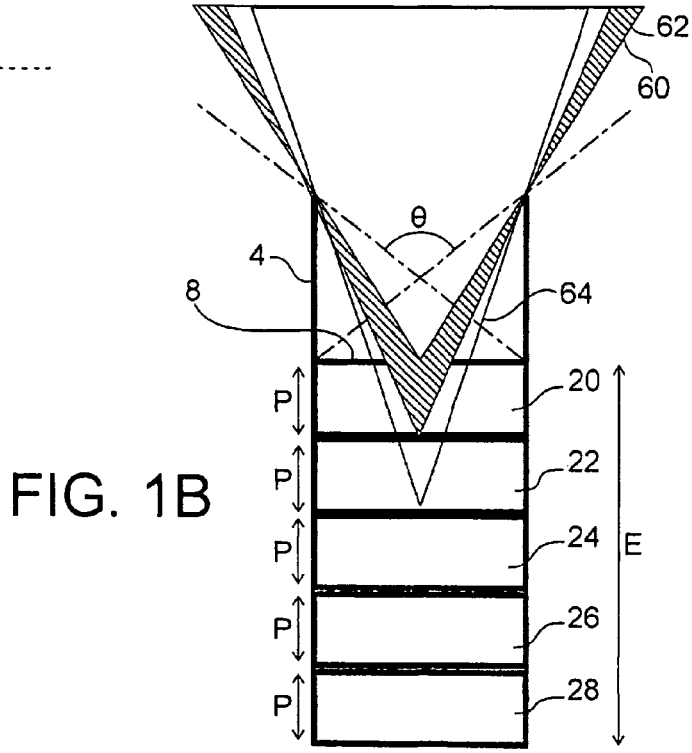

In FIG. 1B, this same detector pixel, according to the invention, in the depth from the entry face 8, is divided into n slices of thickness p equal to the accuracy which may be attained for localizing a photon in the detector (n=E/p).

According to one example, the measurement of the interaction depth (DOI) may be of the order of 1 mm for a detector having a thickness H of 5 mm. The detector of FIG. 1A may therefore be <<cut out>> into 5 sublayers 20, 22, 24, 26, 28 each with a thickness of 1 mm (FIG. 1B). As an indication, such a detector may have a detection surface of 10*10 mm² with 4*4 pixels of dimension 2*2 mm², with a spacing of 2.5 mm between the pixels.

A detection cone is associated with each sublayer. In FIG. 1B, only 3 of these cones 60, 62, 64, respectively associated with the sublayers 20, 22, 24, are illustrated. These cones very schematically represent the aperture of the collimator for a given point of each slice. For the calculations presented later on, the maximum aperture identified by the angle θ illustrated in FIG. 1B is used.

Figure 2A:
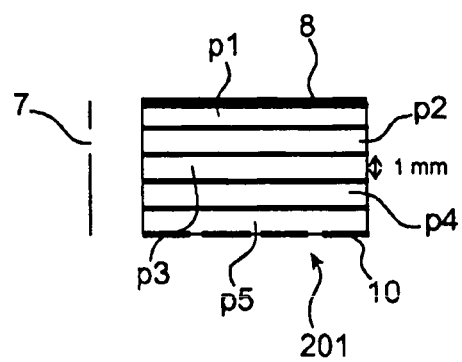
FIGS. 2A and 2B illustrate a detector and various penetration depths in this detector, as well as the change in the rise time of the electric signals versus depth.

In order to experimentally determine the sublayers, a detector such as the detector 201 of FIG. 2A may for example be irradiated edgewise with a point-like source and with a collimator 7 (a hole with a diameter of 0.6 mm for example) which is placed at 5 different positions, P1, P2, P3, P4, P5, spaced out by 1 mm, between a cathode 8 and an anode 10 of the detector.

Figure 2B:
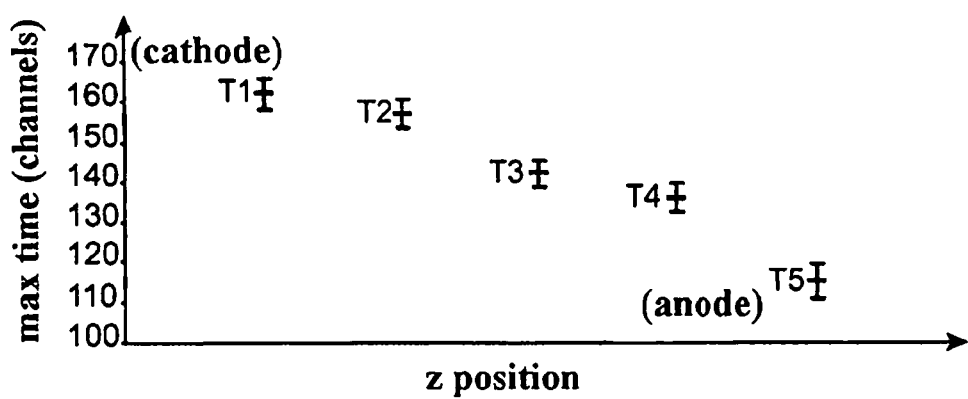

FIG. 2B illustrates the rise times of the electric signals measured depending on the lateral position of the collimator, and therefore on the interaction point in the detector.

The time discrimination of DOI therefore substantially corresponds to the space discrimination of the interactions of the photon in the detector. During the processing of the data, the detector may therefore be discretized into sublayers, each sublayer having the size of the accuracy obtained on measuring DOI.

A first means for recovering the interaction depth (DOI) in a detector consists of providing for each pixel, a stack of n conductive layers each connected to a dedicated set of anode and cathode. The depth information is therefore immediately available and it is not necessary to provide specific means for determining DOI.

In the case when a monolithic detector is used, each pixel is connected to a set of anode and cathode. Each pixel is then fictitiously broken down into several sublayers and the electric signals stemming from interactions in different voxels of this pixel are all <<collected>> on a same anode. Means for determining the DOI from the signal received on the anode of each pixel are then provided.

An exemplary method for obtaining DOI in a detector is the use of the technique of bi-parametric spectra as described in EP-763 751 for example where an anode signal is used for example. Examples of bi-parametric spectra are also given in the document of E. Gros d'Aillon et al., IEEE Trans. on Nucl. Science, 52, 6, 3096-3102, 2005.

As explained in the document EP-763 751, a bi-parametric spectrum links a set of rise times and a set of amplitudes of measured electric signals with constant charge or energy. For each interaction, an amplitude and a rise time may be measured on the corresponding electric signal. Moreover, the closer the photon interaction is to the collimator, the longer is the rise time and the larger is the amplitude. Thus, by knowing the amplitude or the rise time of a given electrical signal, the interaction depth of the photon at the origin of this signal may be inferred therefrom.

There again a compromise is made between the size of the pixel (intrinsic spatial resolution of the detector) and the DOI measurement accuracy.

In the example given above, the thickness of the detector (5 mm) is discretized into 5 sublayers of 1 mm.

FIG. 1B schematically illustrates what allows determination of the DOI, with the pixel 2 of the detector placed behind a collimator 4. By a technique as the one described above, the accuracy is determined with which the interaction depth of a photon in this detector may be estimated. As a result, each interaction depth may be associated with an aperture cone, the entry face 8 of the detector seeing the cone 60, different from the cone 62 as seen by the sublayer 22 and from the cone 64 as seen by the sublayer 24, and still different from the cones (not shown) as seen by the sublayers 26, 28.

With the invention, a collimator with less high walls than those used usually in gamma-cameras, may be used, for example with a height less than 30 mm or 25 mm, or comprised between 5 mm and 30 mm and/or with larger holes than those used customarily, for example with a diameter comprised between 1 mm and 10 mm.

The examples given above apply constant pitch discretization of the detector (thicknesses p=1 min in FIG. 1B) but slices of non-constant thickness, for example with an increasing thickness depending on the interaction depth, may also be made. Thus, the decrease in the number of photons with depth may thereby be taken into account, and therefore the increase of noise with depth may be compensated.

Figure 3:
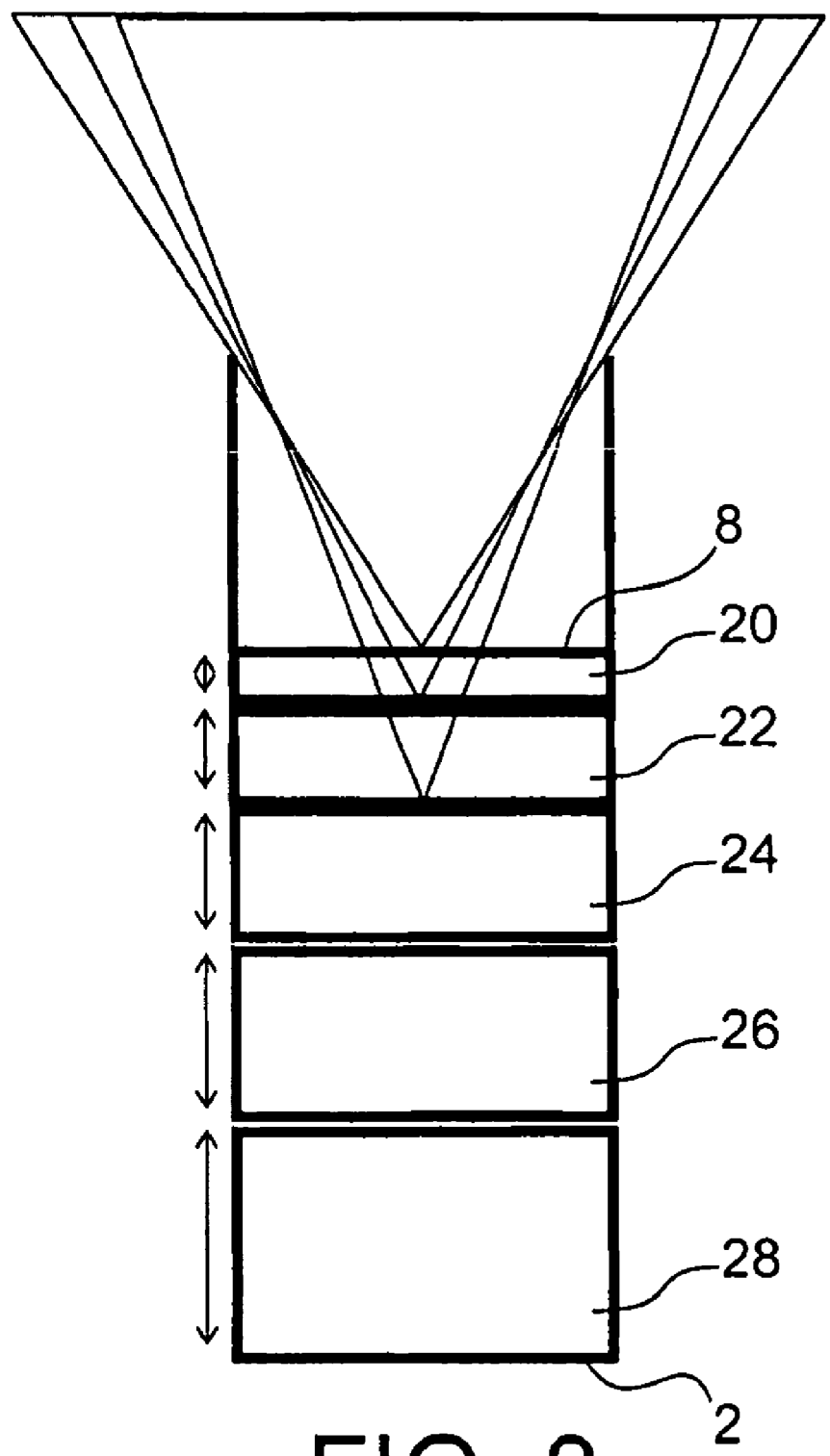
FIG. 3 illustrates a detector and sublayers of a size increasing with the depth in this detector.

Thus, in FIG. 3, a detector 2 is illustrated with slices 20, 22, 24, 26, 28 of increasing thicknesses, the depth increasing from the entry face 8 for the photons in the detector.

Figure 4A:
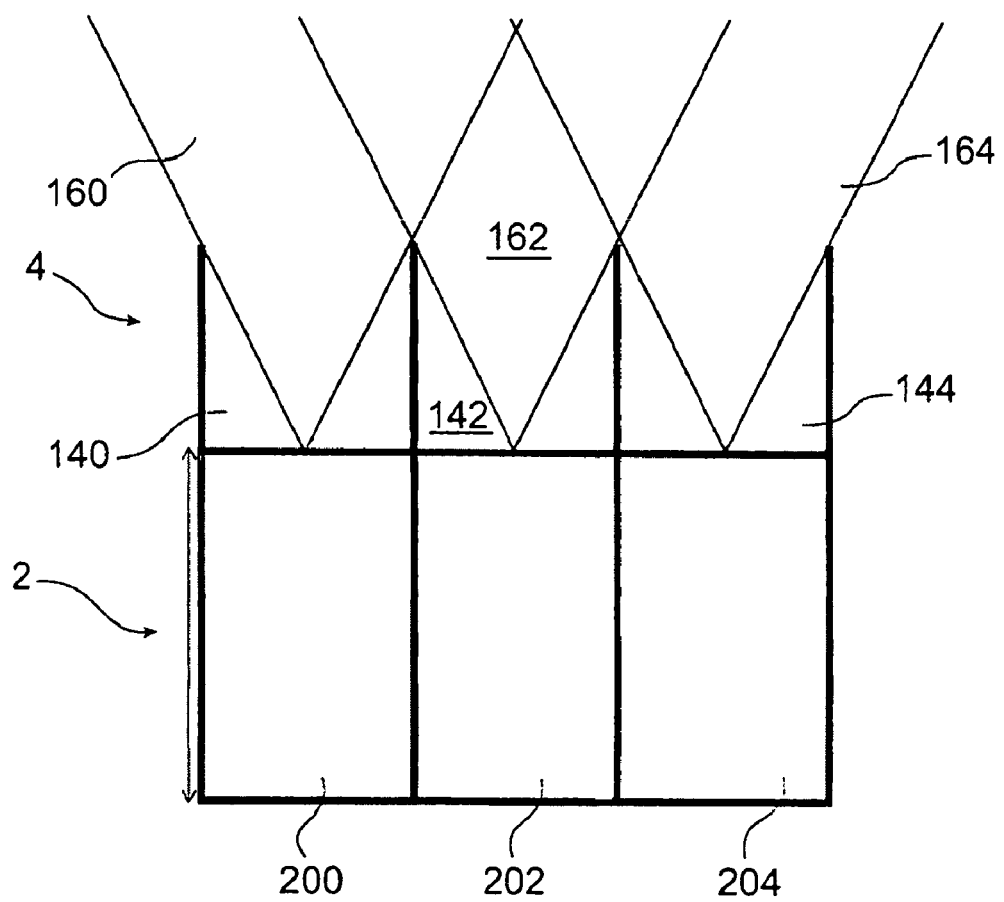
FIGS. 4A and 4B illustrate several detector pixels, with a plurality of holes in the collimator, as well as for each detector pixel, the various depths and the various detection cones associated with these depths, within the scope of a method according to the invention.

As shown in FIG. 4A, a gamma-camera detector customarily consists of a plurality of pixels 200, 202, 204, and is associated with a collimator (with parallel square holes) consisting of a multitude of juxtaposed holes 140, 142, 144. A detection cone 160, 162, 164 is associated with each pixel. Once again, this is a simplification as explained above in connection with FIG. 1B.

Figure 4B:
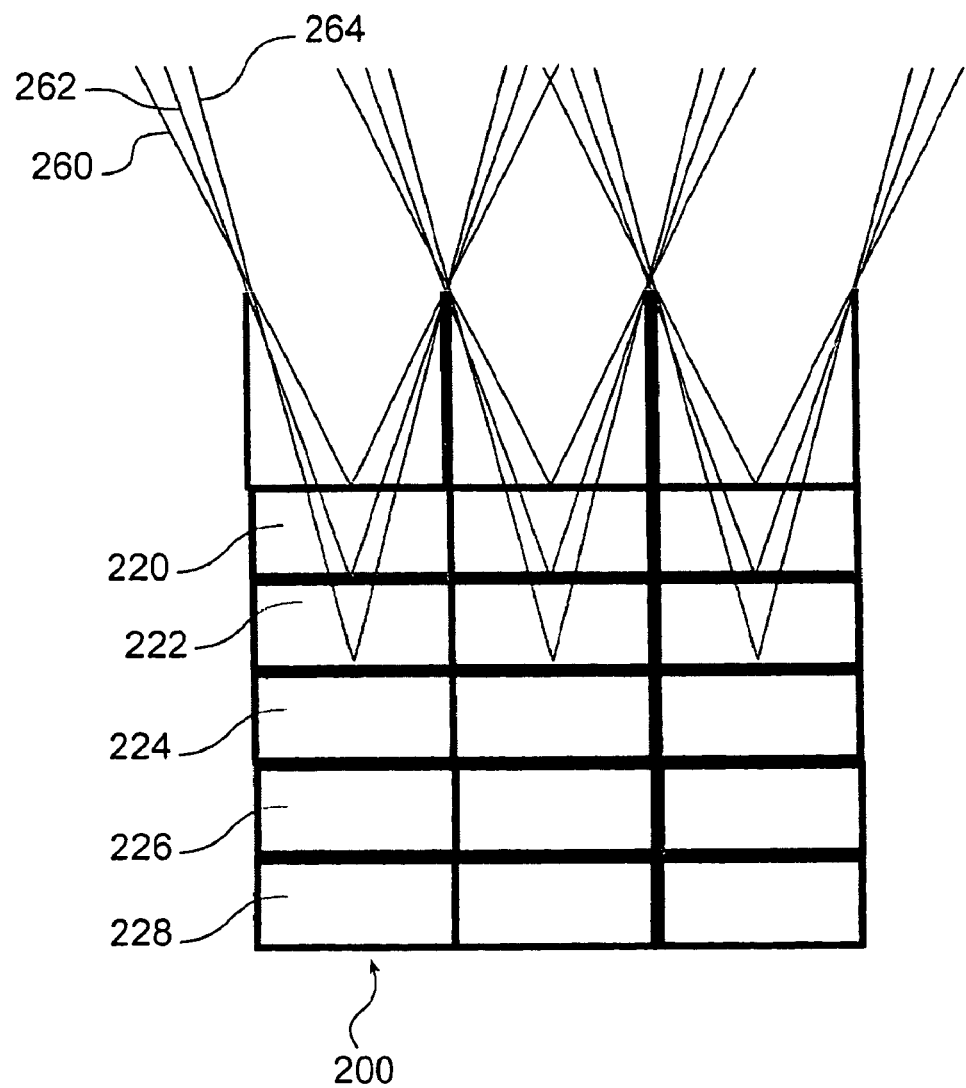

According to the invention, each pixel of the detector is seen to be associated with a set of slices in the body of the latter. Thus in FIG. 4B, the 5 slices corresponding to the areas with a thickness equal to the accuracy are illustrated for each pixel. For the pixel 200, the 5 slices are designated by the references 220, 222, 224, 226, 228. A detection cone is associated with each slice or each pixel; there are therefore 15 cones altogether, in FIG. 4B, but only the cones of the first 3 slices are illustrated for reasons of legibility, the first 3 cones of the first 3 slices of the pixel 200 being designated by references 260, 262, 264.

Figure 5A:
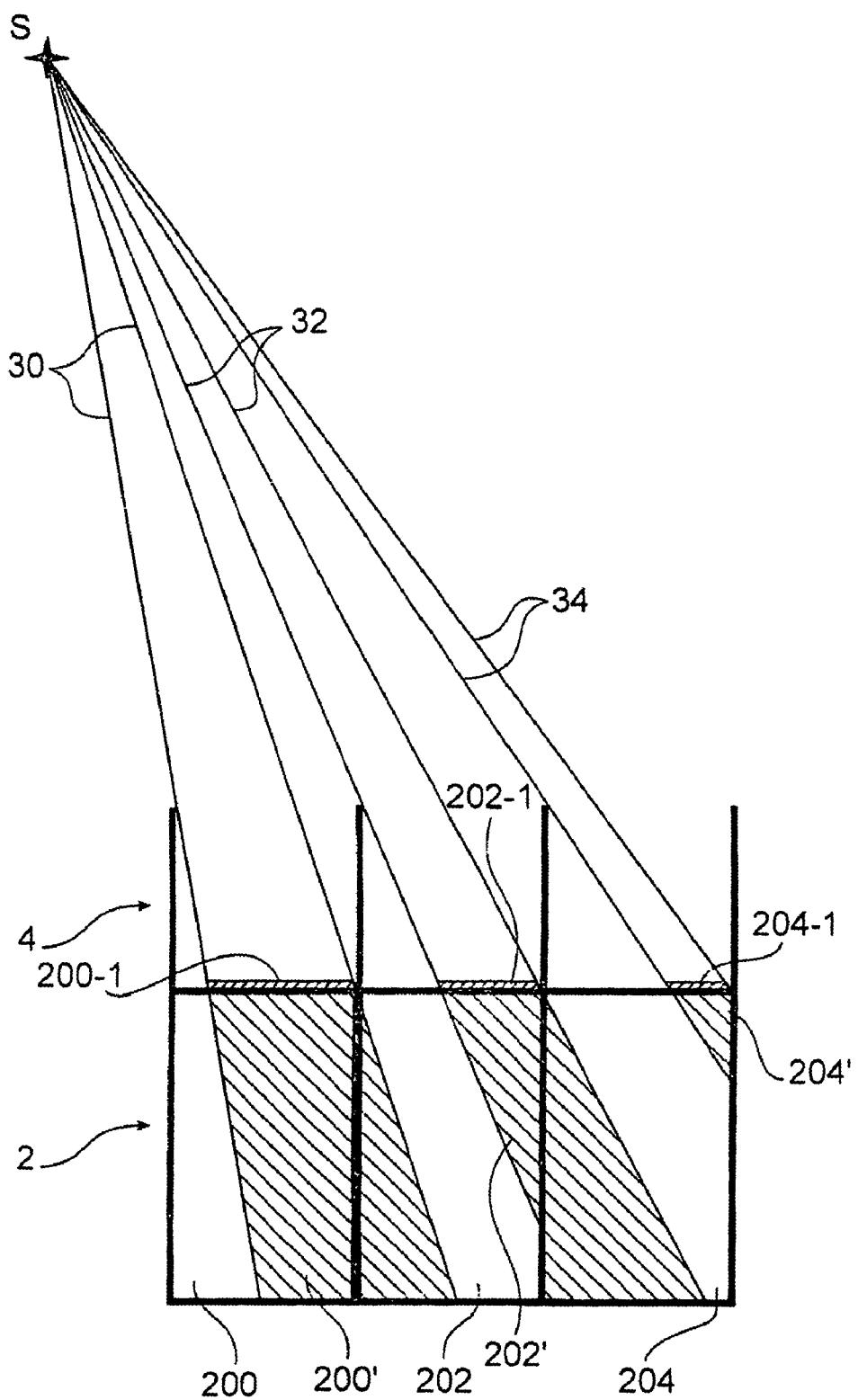
FIGS. 5A and 5B illustrate the illumination by a point-like source on the mono- or multi-layer detector.
Figure 5B:
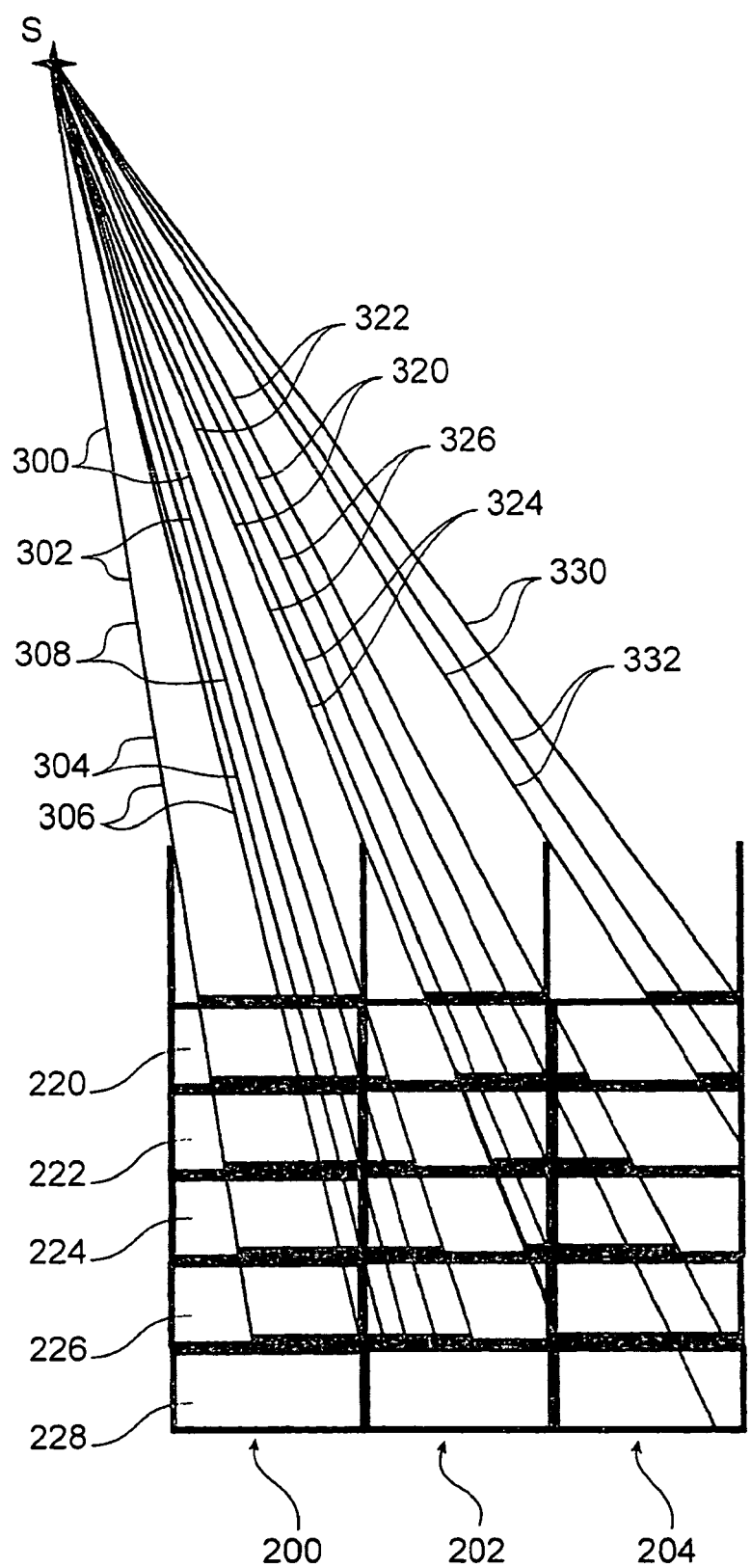

FIGS. 5A and 5B provide a schematic illustration for a point-like radiation source S, of the contribution of a DOI measurement: FIG. 5A is a standard measurement case, without any estimation of DOI, while FIG. 5B provides an illustration of the additional information which may be obtained on the spatial localization of a source S during the implementation of the invention.

In one case (FIG. 5A), with each pixel 200, 202, 204, a global set of interactions is associated, resulting from the illumination 30, 32, 34 of the photon source on the detector pixels, schematically illustrated in the figure. By the effect of the collimator 4, only a portion, identified by reference 200-1, 202-1, 204-1 of the entry surface of each pixel, localized by an overthickness of the line in the figure, is crossed by photons from the source. The set of interactions resulting from the illumination 30 (respectively 32) is associated with the pixel 200 (respectively 202). Each interaction area 200', 202', 204' in each pixel is illustrated by hatchings.

In the other case (FIG. 5B), much more information is obtained which will be used with benefit during the reconstruction step in a planar or tomographic mode. This information stems from the set of the illuminations 300-308, 320-324 and 330-332. The penetration areas of the entry surfaces of each area corresponding to a given depth in each pixel are there also illustrated as an overthickness. It is understood that better spatial resolution may be achieved with processing taking into account the DOIs. As regards the source S of FIG. 5B, additional information is therefore obtained on its spatial localization. For all the pixels of FIG. 5B, a partition of the detector may also be made into sublayers of non-constant thickness, as in FIG. 3 for a single pixel, with which the noise increase with depth may thereby be better taken into account.

If the example of the detector with a thickness of 5 mm is again taken, for each pixel, five pieces of information will be available, the detector being divided during the data processing,—in the sense already explained above—into five layers each with a thickness of 1 mm.

Figure 6:
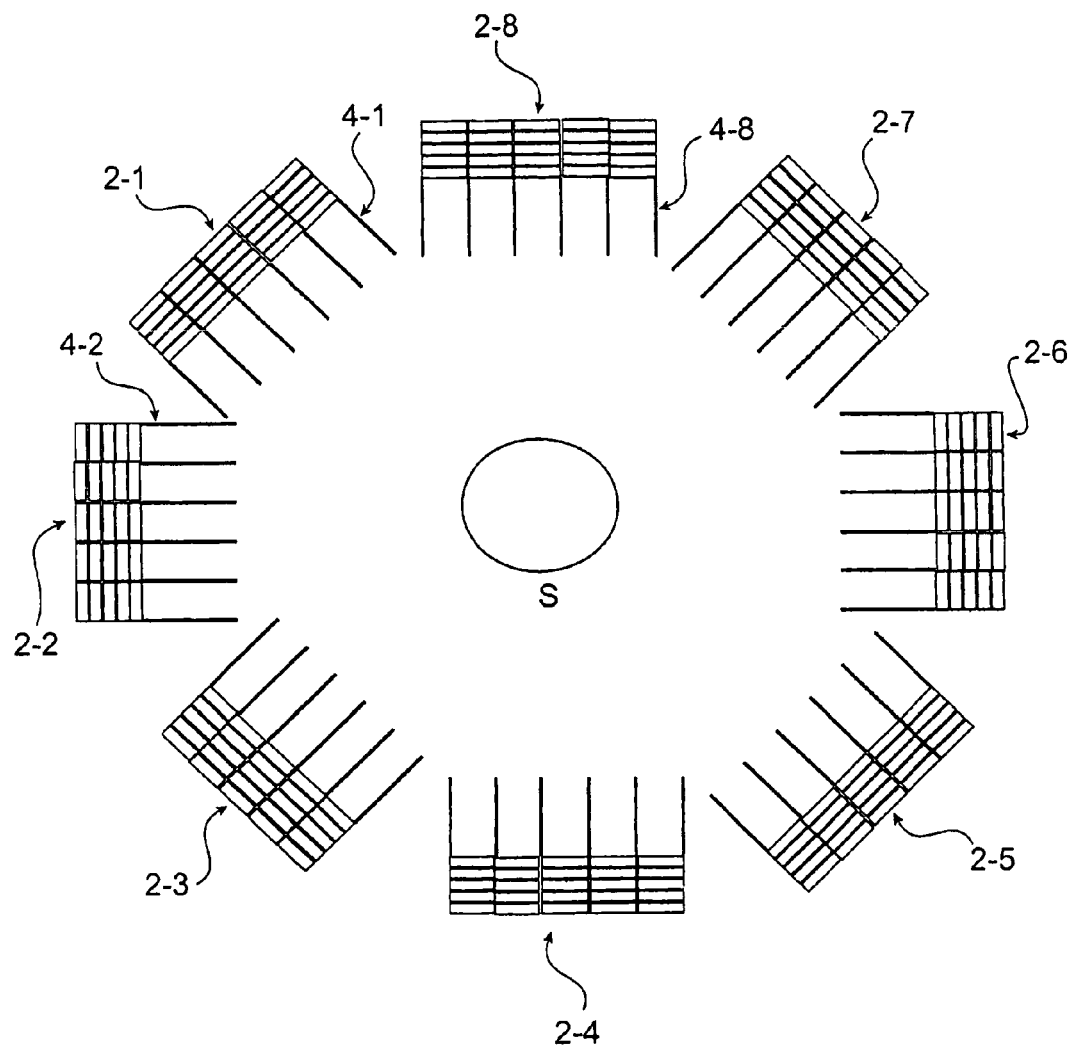
FIG. 6 illustrates a possible application of the invention in a tomographic mode.

FIG. 6 illustrates the implementation of the DOI measurement in reconstruction methods in a tomographic mode. The latter is a mode in which acquisitions under different viewing angles are accomplished. An object S, a source of radiation, is placed at the centre of a set of detectors 2-1, 2-2, ... 2-8 (2-i, i=1-8). Each detector is associated with a collimator 4-1, 4-2, ... 4-i, (i=1-8). The set of detectors may be positioned as a crown around the object S. Or else, a single detector/collimator assembly may be used which is rotated around the object. Also two or more detector/collimator assemblies either stationary or which are rotated around the object, may be used. With all these configurations, at least two acquisitions at different viewing angles may be accomplished.

For each detector 2-i, a partition in sublayers as explained above in connection with the preceding figures, is made, whereby these sublayers may be of identical thicknesses or increasing thicknesses depending on the depth as illustrated in FIG. 3 for one pixel. With these sublayers, the depth of each interaction or each group of interactions in each detector may be taken into account and reconstruction may be performed with the advantages already stated above (and notably better accuracy).

Figure 7:
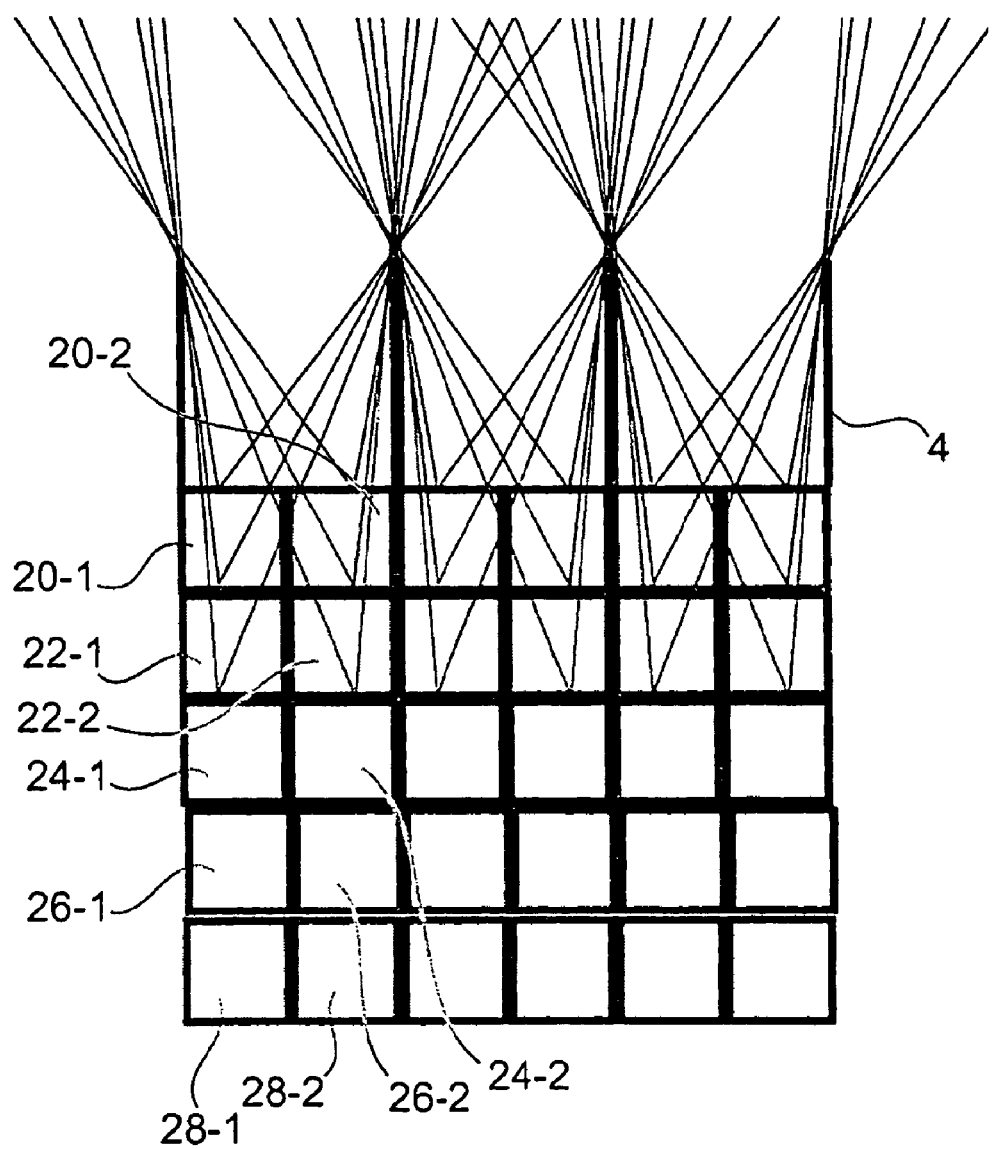
FIG. 7 illustrates another embodiment of the invention, in which a detector is pixelized in the holes of the collimator.

FIG. 7 illustrates the implementation of the DOI measurement in reconstruction methods, on a collimator 4 with parallel square holes, with two (or more than two) physical detector pixels, in a planar or tomographic mode.

In order to further improve accuracy as to spatial localization of the sources, each pixel may indeed be <<sub-pixelized>> in each hole of the collimator. In FIG. 7, cells or voxels, 20-1, 20-2, 22-1, 22-2, 24-1, 24-2, 26-1, 26-2, 28-1, 28-2, of the first detector pixel are identified. With each voxel is associated a detection angle, with which the accuracy of the image reconstructed from the conducted measurements may further be increased. For the sake of clarity, all the detection cones are not illustrated in FIG. 7.

This embodiment of the invention may be combined with variable thicknesses of the sublayers, as illustrated in FIG. 3, and with an embodiment in a tomographic mode as illustrated in FIG. 6.

Various geometries may therefore be achieved, in which a hole of the collimator is associated with a detector pixel (as in FIG. 4B) or a hole of the collimator is associated with two detector pixels (this is the case of FIG. 7). Generally, any integer number n of pixels may be associated with each collimator hole.

Regardless of the contemplated embodiment, with the information relating to DOI, it is possible to break down a detector into multi-layers. More specifically, the detector is broken down, in a top view, into pixels, each pixel being discretized or broken down into several superposed voxels.

According to an embodiment of the present invention, before reconstructing a source image, one proceeds with observation of this source for a predefined time. During this observation, for each photon received by the detector, the voxel of the detector in which the photon has interacted is determined. Counting is then performed in order to determine at the end of this period of observation the number of photons having interacted in each voxel. With each voxel, a raw datum is then associated corresponding to a number of counts measured for this voxel. A differential datum corresponding to a difference between two values of raw data as this is described in more detail hereafter may also be associated with each voxel. The reconstruction is then carried out from these <<statistical>> data, raw data or differential data.

The reconstruction may use data blocks, for example defined as:
the group of data per sublayer of the detector,
or the group for each detector pixel, of the data stemming from the voxels of this pixel and present in the different layers of the detector.

The reconstruction will then be made:
voxel after voxel in any or a well-determined order,
data block after data block in any or a well-determined order.

Figure 8:
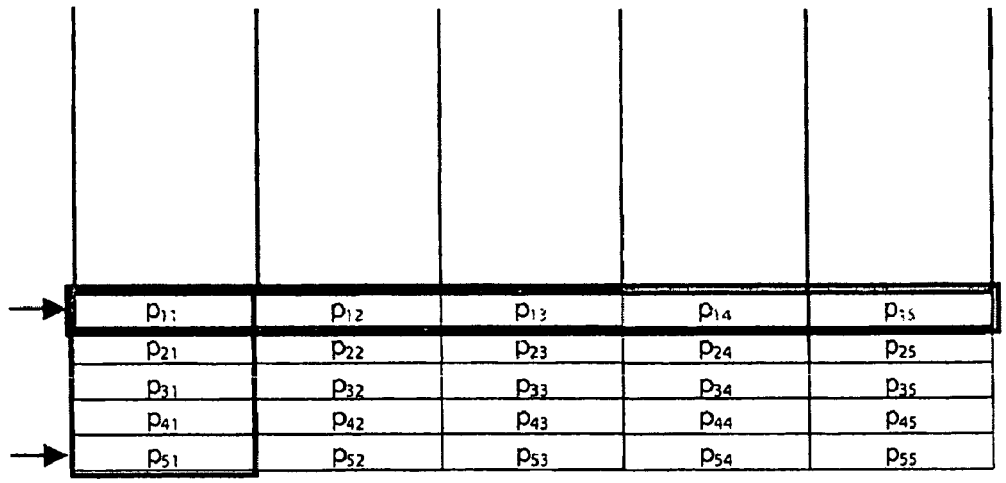
FIG. 8 illustrates various blocks of data which may be obtained according to the invention in a detector.

FIG. 8 gives an example of two types of feasible data blocks : one data block per layer (example: p11, p12, p13, p14, p15), one data block per detector pixel (example: p11, p21, p31, p41, p51).

The methods described by Bruyant P. P. <<Analytic and Iterative Reconstruction Algorithms in SPECT>> Journal of Nuclear Medecine, Vol. 043, No. 10, pp 1343-1358, 2002, or further by Vandenberghe S. <<Iterative reconstruction algorithms in nuclear medicine>> Computerized Medical Imaging and Graphics 25 105-111, 2001, may be used for the reconstruction.

Among the reconstruction methods which may be used, mention may be made both of algebraic iterative reconstruction methods (ART or SART for example) and statistical iterative methods (MLEM, OSEM or MAP for example). These five methods are described in the articles of Bruyant P. P. and Vandenberghe S. mentioned above.

The reconstruction methods allow reconstruction of the object from one or more sets of statistical data possibly acquired at different viewing angles, notably in a tomographic mode.

Iterative methods are based on the discrete and matrix expression of the problem of tomographic reconstruction:

$$[P]=[R][f]$$

where p is the projection acquired by the detector at angle θ, R is the projection operator at angle θ and f corresponds to the object to be reconstructed.

Figure 9A:
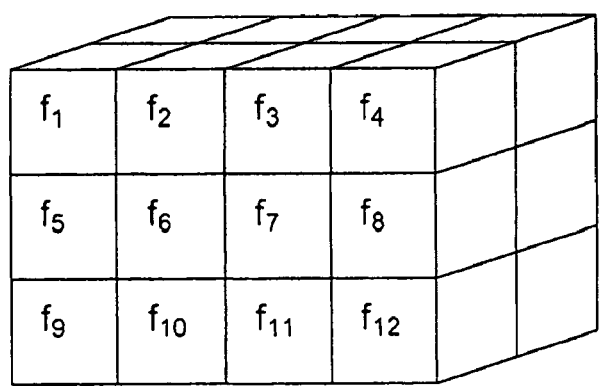
FIGS. 9A and 9B illustrate voxels of an object, and an iterative diagram for processing collected statistical data.

More specifically, the object to be reconstructed is partitioned into I voxels, each voxel emitting a photon intensity fi, i being comprised between 1 and I. FIG. 9A represents an exemplary partition of the object to be reconstructed. Moreover, the detector is broken down into K voxels. A raw or differential datum pk is associated with the $k^{th}$ voxel of the detector, k being comprised between 1 and K.

The discrete representation is made both on a projection (p) and on the image to be reconstructed (f).

The matrix expression [p]=[R][f] is equivalent to writing:

$$\begin{bmatrix} p_1 \\ p_2 \\ \dots \\ p_k \\ \dots \\ p_K \end{bmatrix} = \begin{bmatrix} r_{11} & \dots & r_{1i} & \dots & r_{1I} \\ \dots & \dots & \dots & \dots & \dots \\ \dots & \dots & \dots & \dots & \dots \\ \dots & \dots & r_{ki} & \dots & \dots \\ \dots & \dots & \dots & \dots & \dots \\ r_{K1} & \dots & r_{Ki} & \dots & r_{KI} \end{bmatrix} \begin{bmatrix} f_1 \\ f_2 \\ \dots \\ f_i \\ \dots \\ f_I \end{bmatrix}$$

wherein k is the 3D coordinate of the kth detector voxel and wherein i is the 3D coordinate of the ith object voxel. The fact of considering according to the invention sublayers in the detector adds terms pk (=statistical datum associated with the kth voxel) to the matrix P and terms rki to the matrix R. The calculations are therefore more numerous than in the case when only one detector layer is considered, but with them increased accuracy may be obtained.

$$p_k = \sum_{i=1}^{I} r_{ki} f_j$$

is the measurement of the sum of the activity along the kth projection and rki is the matrix element of the projection operator R of size K×I, representing the probability that a photon emitted by the ith object voxel is detected by the kth detector voxel.

With the iterative methods, it is possible through successive steps to approach a solution [f] by minimizing the quadratic error between an acquired matrix p listing measured statistical data and an estimated projection of the reconstructed object corresponding to Rf. Therefore: min ||p acquired−Rf||², is sought.

Figure 9B:
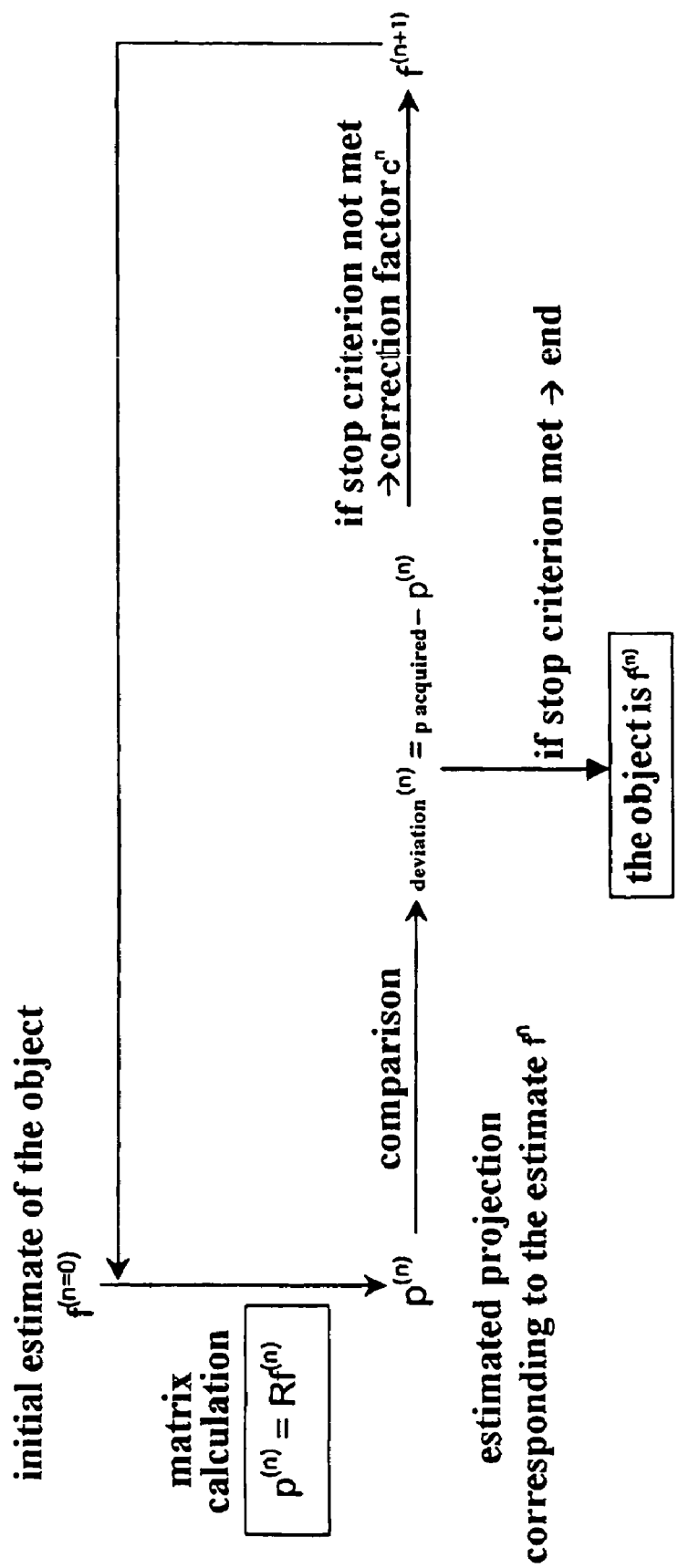

FIG. 9B is a diagram of an iterative method.

In a preliminary step, from the electric signal measurements conducted at the terminals of the detector, an acquired matrix p is defined which lists for each voxel of the detector a raw or differential statistic datum depending on the number of measured interactions in this voxel.

And then from an initial estimate of an object f(n=0), an initial matrix calculation is performed:

$$p(n=0)=R.f(n=0),$$

which gives an initial estimated projection p(n=0) corresponding to the estimate f(n=0) of the object.

The initial estimated projection p(n=0) is then compared with the acquired matrix p by calculating a distance between these matrices as:

$$\text{Distance}(n=0)=p \text{ acquired}-p(n=0)$$

The <<smaller>> the distance, the closer the matrix p(n=0) is to p acquired, and therefore the closer is the initial estimate f(n=0) to reality, and vice versa.

The distance E(n=0) is then compared with a predefined threshold value.

If the distance E(n=0) is less than this threshold value, the procedure is stopped because a good matrix f has been identified at the first attempt. However this is not very likely, and in the majority of the cases, a new estimate f(n=1) is then defined. To do this, a correction factor cn may be applied to f(n=0).

The aforementioned steps are then resumed by calculating a new estimated projection p(n=1) and then a deviation E(n=1). In the case when this new deviation is larger than the aforementioned threshold value, a new estimate f(n=2) is defined and so forth.

In order to avoid a too large number of iterations, a maximum number of iterations may be defined. The retained estimate f is then the last obtained or possibly the estimate which has led to a minimum deviation E.

The factor cn used for defining a new estimate depends on the iterative method used. For implementing such methods, reference may be made to the articles mentioned earlier of Bruyant P. P. and Vanderberghe S. as well as to the text books entitled <<Mathematical Methods in Image Reconstruction>> of Frank Natter and Frank Wübbeling and <<La Tomographie sous la direction de Pierre Grangeat>> (Tomography under the supervision of Pierre Grangeat).

In the case of methods of type SART, OSEM, the subsets of data used in the iteration loops then correspond to data blocks as defined above.

In the case of a reconstruction in a tomographic mode, data blocks acquired at different viewing angles may alternatively be used.

Practical exemplary embodiments of the invention will be provided.

In a first example, a reconstruction method is implemented which uses 5 sublayers of a detector with a thickness of 5 mm. The accuracy in measuring DOI is 1 mm.

Figure 10:
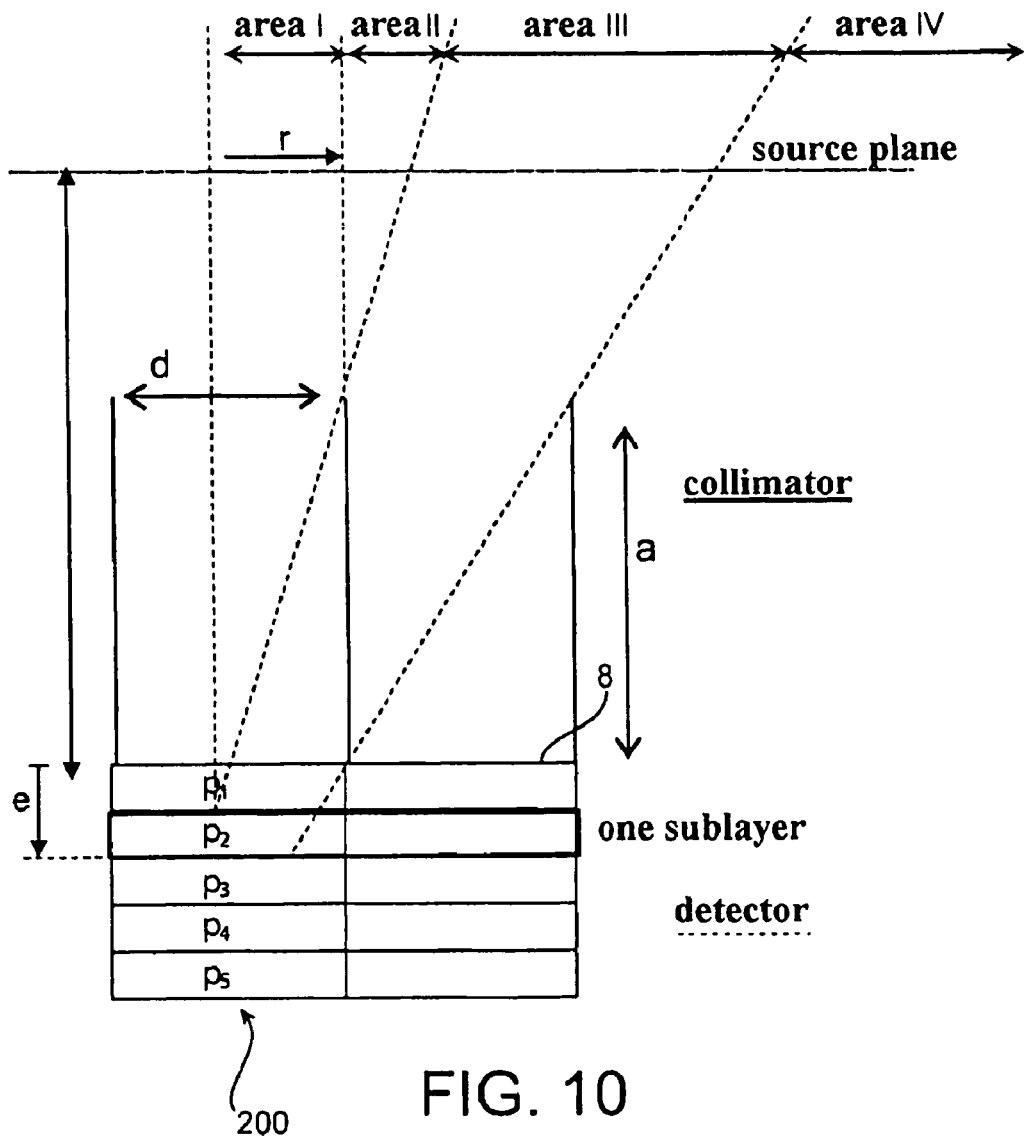
FIG. 10 is a diagram illustrating the definition of 4 illumination areas.
Figure 11A:
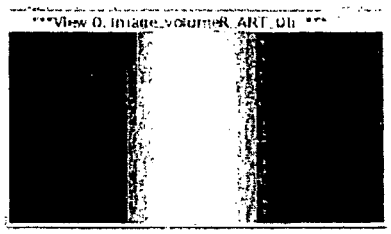
FIGS. 11A-11D and 12A-12D represent images reconstructed by various methods in a planar mode with a single layer detector on the one hand (FIGS. 11A-11D) and a multilayer detector on the other hand (FIGS. 12A-12D).
Figure 11B:
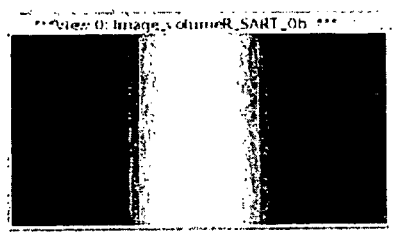
Figure 11C:
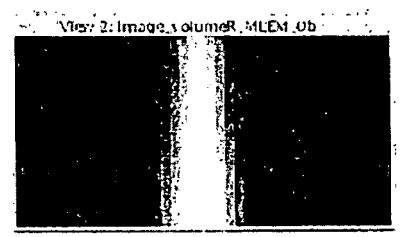
Figure 11D:
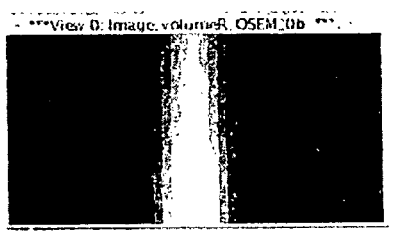
Figure 12A:
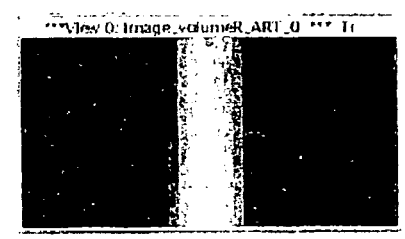
Figure 12B:
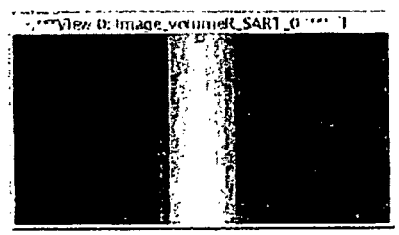
Figure 12C:
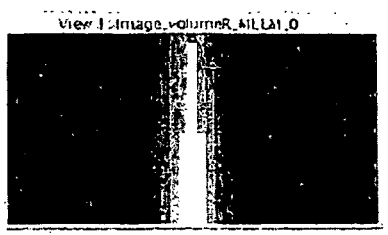
Figure 12D:
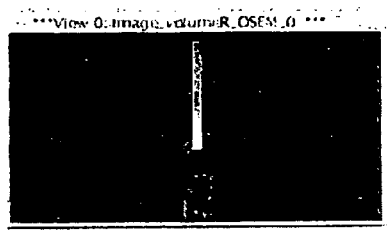
Figure 13A:
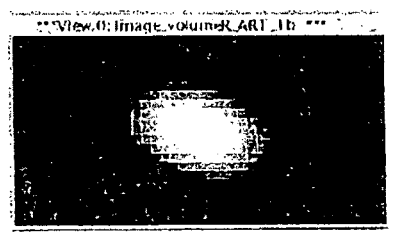
FIGS. 13A-13D and 14A-14D represent images reconstructed by various methods, in a tomographic mode, with a single layer detector (13A-13D) on the one hand and a multilayer detector on the other hand (FIGS. 14A-14D).
Figure 13B:
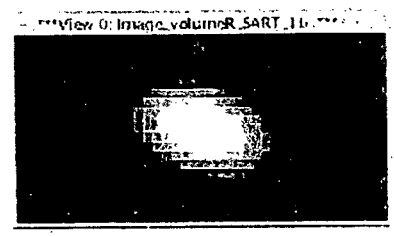
Figure 13C:
Figure 13D:
Figure 14A:
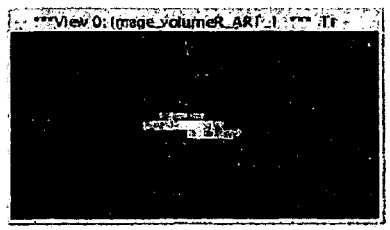
Figure 14B:
Figure 14C:
Figure 14D:
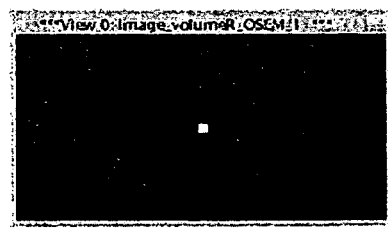
Figure 15A:
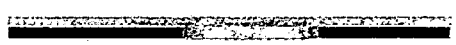
Figure 15B:
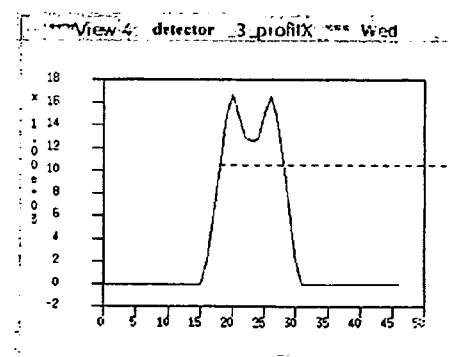
Figure 15C:
Figure 15D:
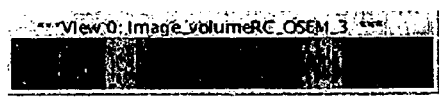
Figure 15E:
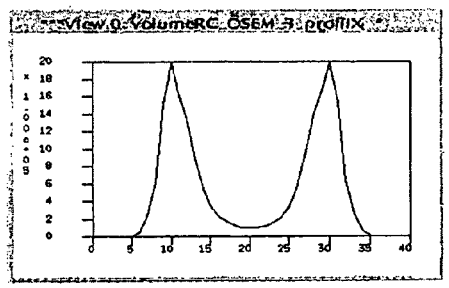
Figure 16A:
Figure 16B:
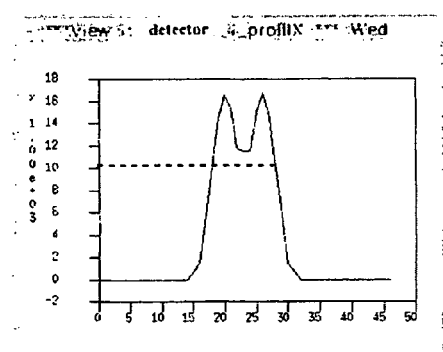
Figure 16C:
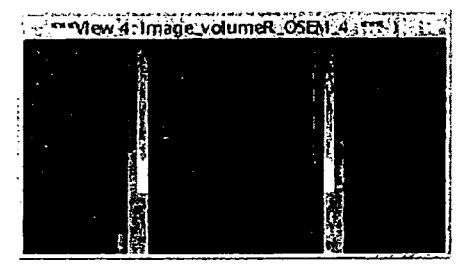
Figure 16D:
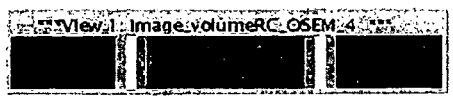
Figure 16E:
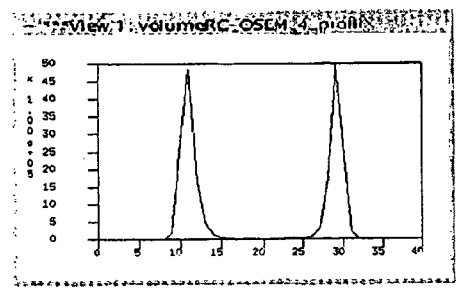
Figure 17A:
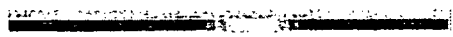
Figure 17B:
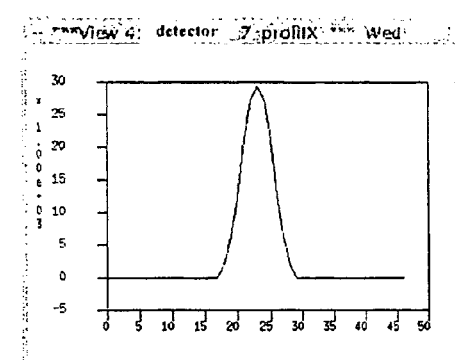
Figure 17C:
Figure 17D:
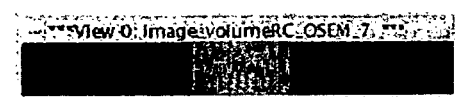
Figure 17E:
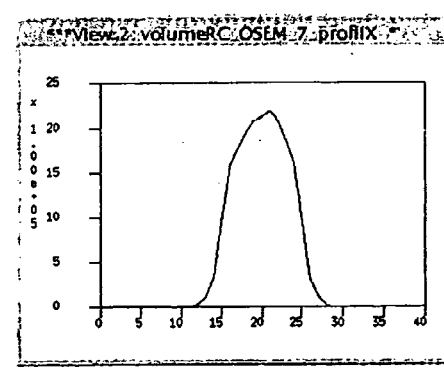
Figure 19C:
Figure 19D:
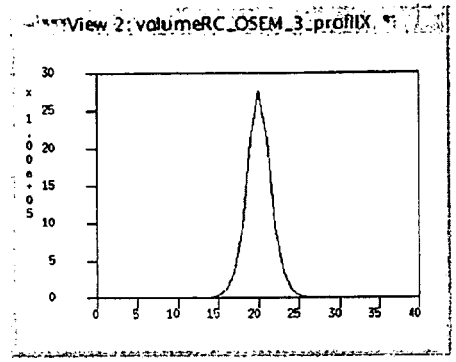
Figure 20A:
Figure 20B:
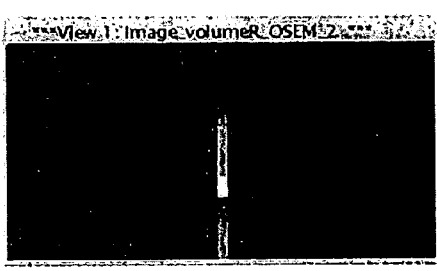
Figure 20C:
Figure 20D:
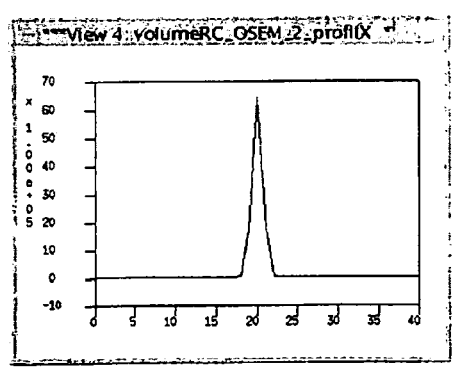
Figure 21A:
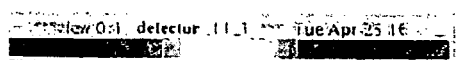
Figure 21C:
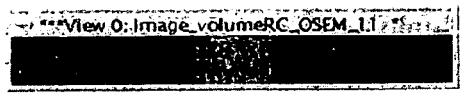
Figure 21B:
Figure 21D:
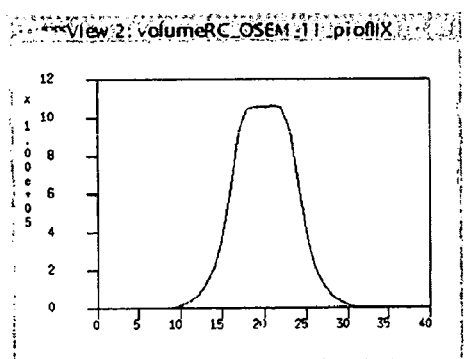
Figure 22A:
Figure 22B:
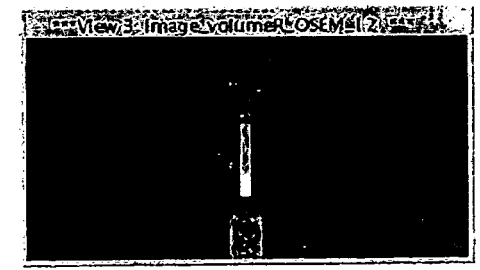
Figure 22C:
Figure 22D:
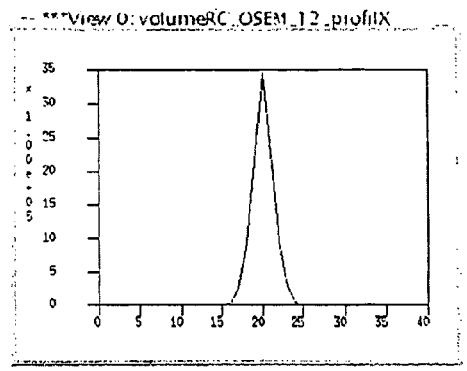
Figure 23C:
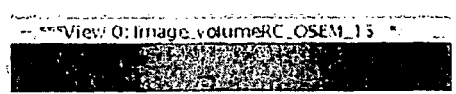
Figure 23D:
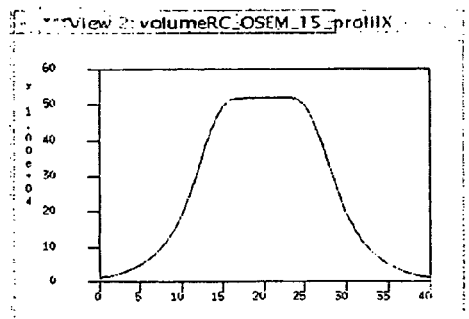
Figure 23A:
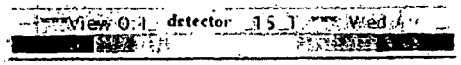
Figure 23B:
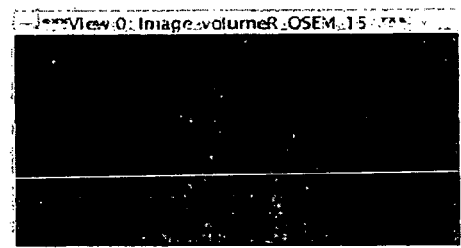
Figure 24A:
Figure 24B:
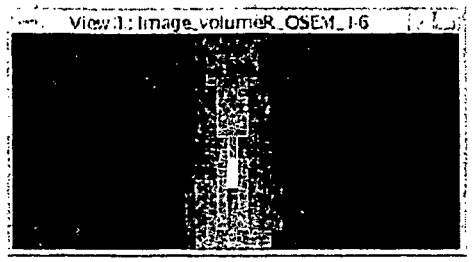
Figure 24C:
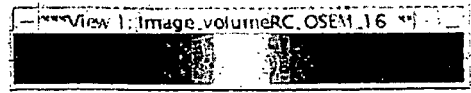
Figure 24D:
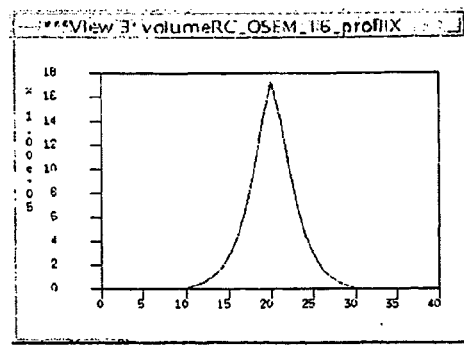

As illustrated in FIG. 10, for each voxel of a given pixel, four illumination areas are defined, r designating the position of a point in this area, parallel to the source plane:

area I: $r \in \left[0; \dfrac{d}{2}\right]$ area II: $r \in \left[\dfrac{d}{2}; d\left(\dfrac{1}{2} + \dfrac{z-a}{a+e}\right)\right]$ area III: $r \in \left[d\left(\dfrac{1}{2} + \dfrac{z-a}{a+e}\right); d\left(\dfrac{1}{2} + \dfrac{z}{a}\right)\right]$ area IV: $r > d\left(\dfrac{1}{2} + \dfrac{z}{a}\right)$ wherein e is the distance between the entry face 8 of the detector pixel and the relevant sublayer. For the first sublayer, corresponding to pixel p1, the distance e is zero. The distance e has the value 1, 2, 3 or 4 mm for the second, third, fourth and fifth sublayers, respectively.

The selection of 4 areas is exclusively a simplification, for the mathematical calculation which will be presented.

Two evaluations of the coefficients of the matrix R are possible:

1. by a mathematical geometrical calculation; the calculations are here presented for a one-dimensional geometry. They may be generalized to two dimensions.

2. by SINDBAD simulation, a simulation software package described in documents of A. Glière et al.: "Sindbad: From CAD Model to Synthetic Radiographs." Review of Progress in Quantitative Nondestructive Evaluation, ed. by D. O. Thompson and D. E. Chimenti, Vol. 17, pp 387-394, 1998; R. Guillemaud et al.: SINDBAD: a multi purpose and scalable X-ray simulation tool for NDE and medical imaging", PSIP 2003, Grenoble France; J. Tabary et al.: New functionalities in the SINDBAD software for realistic X-ray simulation devoted to complex parts inspection, Proc. ECNDT, Berlin Sep. 2006.

The simulation provides the advantage of being able to be used in two dimensions, and to take into account in a more realistic way the physical phenomena (for example the septa transparence of the collimator, and the possible attenuation by the source object).

1. Evaluation (in one dimension) of the coefficients of the matrix R by an approximate mathematical geometrical calculation (by supposing a collimator with zero septum thickness):

In the 4 illumination areas:

area I: $R = \dfrac{\theta_1 + \theta_2}{2\pi} * \exp^{-\mu \cdot e} * (1 - \exp^{-\mu \cdot pas\_e})$ -continued with: $\theta_1 = \arctan\left(\dfrac{\dfrac{d}{2}-r}{z+e}\right)$ and $\theta_2 = \arctan\left(\dfrac{\dfrac{d}{2}+r}{z+e}\right)$ area II: $\boxed{R = \dfrac{\theta_2 - \theta_1}{2\pi} * \exp^{-\mu \cdot \theta} * (1 - \exp^{-\mu \cdot pas\_e})}$ with: $\theta_1 = \arctan\left(\dfrac{r-\dfrac{d}{2}}{z-a}\right)$ and $\theta_2 = \arctan\left(\dfrac{r+\dfrac{d}{2}}{z+e}\right)$ area III: $\boxed{R = \dfrac{\theta_2 - \theta_1}{2\pi} * \exp^{-\mu \dfrac{e}{\cos\left(\dfrac{\theta_1-\theta_2}{2}\right)}} * (1 - \exp^{-\mu \cdot pas\_e})}$ with:

$\theta_1 = \arctan\left(\dfrac{r-\dfrac{d}{2}}{z+e}\right)$ and $\theta_2 = \arctan\left(\dfrac{r-\dfrac{d}{2}}{z}\right)$ Area IV: $R = 0$ wherein pas_e corresponds to the thickness of the sublayer of the relevant voxel. In our example, pas_e is equal to 1 mm because all the layers are of equal thicknesses.

2. Evaluation of the coefficients of the matrix R by SIND-BAD simulation (in two dimensions), with which the true matrix R may be obtained. The following is taken into account:

the thickness of the septa by the septal transparence,
transmission and absorption of the sublayers of the detector,
possible attenuation by the object.

Results will be presented: mention will be made of the (mathematical) evaluation of the contribution of DOI on a system in one dimension.

The following will be presented:
evaluation of the iterative methods:
additive algebraic methods (ART or SART),
and multiplicative statistical methods (MLEM or OSEM),
and then the evaluation:
in a planar mode (with a single viewing angle), and
in a tomographic mode (with several viewing angles).

First example: qualitative evaluation (by a mathematical calculation restricted to one dimension) of the contribution of DOI in a planar mode (with a viewing angle: 0°) and in a tomographic mode (with 9 viewing angles: 0°, ±90°, ±67.5°, ±45°, ±22.5°).

In this example, this is the reconstruction of an image with a point-like source centered in the object.

The object has the following dimensions:
Nx=21 voxels and Nz=41 voxels,
pasX=pasZ=0.5 mm (z indicates depth),
dist S_C=85.25 mm (distance from the centre of the object to the collimator 4 (entry face)).

The collimator is a collimator with parallel square holes with a side of 2.0 mm, zero septa and with a height of 20 mm.

The detector consists of 35 pixels (1D) of dimension 2.0 mm, and this detector has a thickness of 5 mm (or is discretized into five detector sublayers each with a thickness of 1 mm).

ART, SART, MLEM and OSEM reconstruction methods are used.

In planar mode, reconstructed images of FIGS. 11A-11D (case of a 5 mm layer) and 12A-12D (case of five 1 mm sublayers) are obtained. In a tomographic mode, the reconstructed images of FIGS. 13A-13D (case of a 5 mm layer) and 14A-14D (case of five 1 mm sublayers) are obtained.

FIGS. 11A, 12A, 13A, 14A are the result of the ART method, FIGS. 11B, 12B, 13B, 14B that of the SART method, FIGS. 11C, 12C, 13C, 14C that of the MLEM method, FIGS. 11D, 12D, 13D, 14D that of the OSEM method.

In a planar mode, FIGS. 11A-12D show that the images reconstructed in a planar mode are of better quality with the additional information on DOI Statistical iterative methods (MLEM et OSEM) provide better reconstruction than algebraic iterative methods and the OSEM method is more performing than the MLEM method.

In a tomographic mode, FIGS. 13A-13D and 14A-14D show that the reconstructed images in this mode provide access to the depth information.

The images reconstructed in a tomographic mode are of better quality with the additional information on DOI.

Second example: qualitative evaluation of the contribution of DOI in a planar mode. An image is reconstructed with one or two point-like sources.

The object has the following dimensions:
Nx=21 voxels and Nz=41 voxels,
pasX=pasZ=0.5 mm,
dist_S_C=100 mm (object-collimator 4 distance).

The collimator is a collimator with parallel square holes of 1.5 mm, zero septa, and with a height of 25 mm.

The detector consists of 47 pixels of size 1.5 mm, and this detector has a thickness of 5 mm possibly broken down into 5 sublayers each of 1 mm.

The OSEM reconstruction method is used.

The first results correspond to the case of two point-like sources and with them the difference between a detector with one layer and a detector with five layers may be investigated for distinguishing two point-like sources.

The following reconstructed images are obtained:
FIGS. 15A-15E (case of a 5 mm layer) and 16A-16E (case of five 1 mm sublayers), for a distance between both sources of 9.5 mm,
FIGS. 17A-17E (case of a 5 mm layer) and 18A-18E (case of five 1 mm sublayers), for a distance between both sources of 3.5 mm.

For both cases (a single 5 mm layer and five 1 mm layers):
FIGS. 15A, 16A, 17A, 18A represent the number of interactions in the case of the detector,
FIGS. 15B, 16B, 17B, 18B represent the detector profile of both sources as seen by the detector,
FIGS. 15C, 16C, 17C, 18C represent the reconstructed image,
FIGS. 15D, 16D, 17D, 18D represent the reconstructed image cumulated over the depth,
FIGS. 15E, 16E, 17E, 18E represent the profile of the reconstructed image.

For the case of several layers each of 1 mm, it may be concluded from these figures that the DOI measurement introduced into the reconstruction allows two close point-like sources to be dissociated, which is impossible without this additional information. DOI therefore improves spatial resolution for a same efficiency of the system.

The second results correspond to the case of a point-like source and allow the difference between a detector with one layer and a detector with 5 sublayers to be investigated by widening the size of the holes of the collimator (passage from one 1.5 mm collimator to a 6 mm collimator).

The following reconstructed images are obtained:
FIGS. 19A-19D (case of a 5 mm layer) and 20A-20D (case of five 1 mm sublayers) for a collimator of 1.5 mm,
FIGS. 21A-21D (case of a 5 mm layer) and 22A-22D (case of five 1 mm sublayers), for a collimator of 3.0 mm, FIGS. 23A-23D (case of a 5 mm layer) and 24A-24D (case of five 1 mm sublayers) for a collimator of 6.0 mm.

For the three cases:

FIGS. 19A, 20A, 21A, 22A, 23A, 24A represent the number of interactions in the detector, FIGS. 19B, 20B, 21B, 22B, 23B, 24B represent the reconstructed image, FIGS. 19C, 20C, 21C, 22C, 23C, 24C represent the cumulated reconstructed image, FIGS. 19D, 20D, 21D, 22D, 23D, 24D represent the profiles of the reconstructed image of the point-like source.

With these figures, it is possible to conclude that the DOI measurement introduced in the reconstruction enables the spatial resolution of the reconstructed object to be improved for an identical efficiency.

The change in the efficiency and spatial resolution versus the size of the holes of the collimator is illustrated in FIGS. 25 and 26.

In FIG. 26, the curve I illustrates the resolution for a <<one layer>> detector and curve II for a <<five layer>> detector.

The conclusion of these results (FIG. 25) is that for an increase in the efficiency by a factor 2 (from $83.83 \cdot 10^{-4}$ to $162.30 \cdot 10^{-4}$: FIG. 25), there is an improvement in the spatial resolution of the reconstructed image by 1 mm (passage from 2.5 mm to 1.5 mm). The increase in the efficiency is raised to 4 for a two-dimensional calculation.

For an increase in the efficiency by a factor 4 (from $83.83 \cdot 10^{-4}$ to $332.43 \cdot 10^{-4}$) there is a same spatial resolution. The increase in the efficiency is raised to 16 for a two-dimensional calculation.

The DOI measurement introduced into the reconstruction therefore enables the efficiency of the system to be increased while also improving the spatial resolution.

As a comparison, FIG. 27 qualitatively illustrates the problem posed when the penetration depth of the photons is not taken into account in the reconstruction technique. Indeed, the photons may interact with the detector 2 over the whole of the trajectory, causing a loss of spatial resolution (illustrated by the distance a in FIG. 27).

With Anger cameras (NaI(T1) scintillator detector), the loss of spatial resolution due to the penetration under an oblique angle of certain photons in the detector is buried in the poor intrinsic spatial resolution of the scintillator (which is of the order of 3 mm at 140 keV).

With semiconducting detectors such as CZT, the intrinsic spatial resolution is much better than for NaI(T1) detectors and the loss of spatial resolution due to the penetration of certain photons under an oblique angle into the detector is visible, causing a blur in the image.

Thus, with semiconductors such as CZT, the information on photon interaction depth in the detector provides limitation of the loss of spatial resolution.

Implementation of the measurement of DOI in iterative reconstruction methods provides:

improvement in the spatial resolution of the system for a same efficiency, or improvement in the efficiency of the system for a same spatial resolution, or improvement in the efficiency and spatial resolution of the system, or improvement in the compromise between efficiency and spatial resolution of the system.

A device according to the invention, such as a gamma-camera, includes a detector or a set of detectors 2, in a planar or tomographic mode, and processing means with which a method may be implemented, such as those described above. These means may be electronic means such as a microcomputer. These electronic means may also be a specific electronic circuit assembled with the detector.

According to an embodiment of a device according to the present invention, viewing means may be provided in order to view a reconstructed image such as those of FIGS. 11A-11D, 12A-12D, 13A-13D, 15A-15E, 16A-16E, 17A-17E, 18A-18E, 19A-19D, 20A-20D . . . etc.

Memory storage means may also used for storing in memory biparametric spectra as defined earlier with reference to the patent application of the applicant EP-763 751.

The device then includes means for determining the number of interactions in each sublayer, or voxel, or each pixel of the detector.

The memory storage means may also store in memory various segmentations of a same detector, for example a segmentation in sublayers of identical thicknesses, or in sublayers with increasing thicknesses (model of FIG. 3) whether the detector is considered as having a single detector pixel per collimator hole (FIG. 4A) or several pixels per collimator hole (case of FIG. 7), the user being able to select the desired segmentation by means of a pull-down menu for example.

Regardless of the embodiment, the information relating to DOI allows a detector to be described in multi-layers. Each pixel is then discretized in voxels placed on these different layers. The statistical data obtained for each voxel may be used in various ways upon reconstruction, whether this occurs voxel per voxel or by grouping voxels in blocks.

The raw statistical data may also be processed in order to obtain differential statistical data by differential filtering prior to reconstruction. Each differential statistical datum for example corresponds to a difference between reception cones of two neighbouring voxels, therefore with slightly different angular apertures: for example this difference is illustrated by hatchings in FIG. 1B for both cones referenced as 60 and 62.

With such prior processing of the data, making them more independent in the sense of probabilities, the reconstruction algorithm can converge better.

At the level of the matrix expression (formula $[p]=[R][f]$ above, this amounts to changing p; typically two elements of p are replaced, for example $p_1$ and $p_2$, with $p_1$ and $p_1-p_2$, if $p_1$ and $p_2$ relate to two detector voxels with the same spatial position, belonging to a same pixel, but in different layers (at different depths). As a result, the matrix R is more <<sparse>> (in the mathematical sense, i.e. it contains more zeros); indeed each new element of p corresponds to a smaller number of object voxels. The result of the reconstruction algorithm is then potentially better.

According to an embodiment of the present invention, only interactions of the photoelectric type and not Compton effect interactions are taken into account. A means for getting rid of Compton interactions is described in the French patent application of the applicant of number FR 2790560.

The invention claimed is:

1. A method for reconstructing an image from a source (S) of photons, from interactions of photons emitted by this source, with a detector of a gamma-camera, positioned behind a collimator, comprising:
reconstructing an image of the source (S) of photons, the method further comprising breaking down the detector into several pixels, and each pixel into several voxels, and further comprising, prior to the reconstruction step, the following steps:
determining for each received photon, the voxel of the detector in which the photon has interacted, and
counting for each voxel of the detector the number of photons having interacted in this voxel, defining for each voxel of the detector, a raw or differential statistical datum, a raw datum corresponding to the number of photons counted for the relevant voxel, a differential datum corresponding to a difference between numbers of counted photons, and wherein the reconstruction step is implemented from said statistical data.

2. The method of claim 1, wherein each pixel is divided into several voxels for each collimator hole.

3. The method according to claim 1, the volume of each portion of the detector located in the extension of each hole of the collimator, comprising at least two pixels.

4. A method for reconstructing an image from a source (S) of photons, from interactions of photons emitted by this source, with a detector of a gamma-camera, positioned behind a collimator, comprising:

breaking down the detector into several pixels, and each pixel into several voxels, determining for each received photon, the voxel of the detector in which the photon has interacted, counting for each voxel of the detector the number of photons having interacted in this voxel, defining for each voxel of the detector, a raw or differential statistical datum, a raw datum corresponding to the number of photons counted for the relevant voxel, a differential datum corresponding to a difference between numbers of counted photons, and reconstructing an image of the source (S) of photons from said statistical data.

5. The method of claim 4, wherein each pixel is divided into several voxels for each collimator hole.

6. A method for reconstructing an image from a source (S) of photons, from interactions of photons emitted by this source, with a detector of a gamma-camera, positioned behind a collimator, comprising:

breaking down the detector into several pixels, and each pixel into several voxels, determining for each received photon, the voxel of the detector in which the photon has interacted, counting for each voxel of the detector the number of photons having interacted in this voxel, defining for each voxel of the detector, a raw or differential statistical datum, a raw datum corresponding to the number of photons counted for the relevant voxel, a differential datum corresponding to a difference between numbers of counted photons, and reconstructing an image of the source (S) of photons from said statistical data, said reconstructing implementing an iterative reconstruction method starting from a modeling connecting the detector and the image of the source to be reconstructed, defined by [p]=[R][f] wherein

[f] is a matrix comprising I terms f1 to fI, the $i^{th}$ term fi corresponding to a number of photons emitted by an $i^{th}$ voxel of the source,

[p] is a matrix comprising K terms p1 to pK, K being equal to the number of voxels of the detector, the $k^{th}$ term pk corresponding to the statistical datum determined for the $k^{th}$ voxel of the detector, and

[R] is a matrix corresponding to a projection operator of [f] on [p].

7. The method of claim 6, wherein each pixel is divided into several voxels for each collimator hole.

8. The method according to claim 6, said reconstructing being carried out according to an algebraic iterative method.

9. The method according to claim 6, said reconstructing method being a statistical iterative method.

10. A device for reconstructing an image of a source of photons from interactions of photons, emitted by this source, with a detector of a gamma-camera positioned behind a collimator, this device including a microcomputer or an electronic circuit to reconstruct an image of the source of photons, wherein the detector is broken down into several pixels, each pixel comprising several voxels, and wherein said microcomputer or said electronic circuit:

determines, for each received photon, the voxel of the detector in which the photon has interacted, counts, for each voxel of the detector, the number of photons having interacted in this voxel, and defines for each voxel of the detector, a raw or differential statistical datum, a raw datum corresponding to the number of photons counted for the relevant voxel, a differential datum corresponding to a difference between numbers of counted photons, reconstructs images from said statistical data.

11. The device according to claim 10, the detector comprising semiconducting material selected from the group consisting of CdZnTe and CdTe type.

12. An imaging device including:

a detector of a gamma-camera, a collimator positioned in front of the detector, and a microcomputer or an electronic circuit for reconstructing images of a source of photons from interactions of photons, emitted by this source, with said detector, said microcomputer or electronic circuit reconstructing an image of the source of photons, wherein the detector is broken down into several pixels, each pixel comprising several voxels, and wherein said microcomputer or said electronic circuit:

determines, for each received photon, the voxel of the detector in which the photon has interacted, counts, for each voxel of the detector, the number of photons having interacted in this voxel, and defines for each voxel of the detector, a raw or differential statistical datum, a raw datum corresponding to the number of photons counted for the relevant voxel, a differential datum corresponding to a difference between numbers of counted photons, and reconstructs images from said statistical data.

13. An imaging device including:

a radiation detector of a gamma-camera, said detector being broken down into several pixels, each pixel comprising several voxels, said detector being monolithic, the voxels of each pixel being defined by virtually breaking down the detector, each pixel being connected to an anode/cathode set, with which the electric signals produced by a photon interaction in one of the voxels of the relevant pixel can be measured;

a collimator positioned in front of the detector, and a microcomputer or an electronic circuit for reconstructing images of a source of photons from interactions of photons, emitted by this source, with said detector, said microcomputer or electronic circuit:

a) associating with each interaction of photon, emitted by said source of photons, with said detector, the voxel of the detector in which the photon has interacted, b) counting, for each voxel of the detector, the number of photons having interacted in this voxel, and defining for each voxel of the detector, a raw or differential statistical datum, a raw datum corresponding to the number of photons counted for the relevant voxel, a differential datum corresponding to a difference between numbers of counted photons, c) reconstructing an image of the source of photons from said statistical data.

14. An imaging device including:
a radiation detector of a gamma-camera, said detector being broken down into several pixels, each pixel comprising several voxels, each voxel of the detector being connected to an anode/cathode set, with which the electric signals produced by a photon interaction in the relevant voxel can be measured,
a collimator positioned in front of the detector,
and a microcomputer or an electronic circuit for reconstructing images of a source of photons from interactions of photons, emitted by this source, with said detector, said microcomputer or electronic circuit:
a) associating with each interaction of photon, emitted by said source of photons, with said detector, the voxel of the detector in which the photon has interacted,
b) counting, for each voxel of the detector, the number of photons having interacted in this voxel, and defining for each voxel of the detector, a raw or differential statistical datum, a raw datum corresponding to the number of photons counted for the relevant voxel, a differential datum corresponding to a difference between numbers of counted photons,
c) reconstructing an image of the source of photons from said statistical data.

15. A method for using, in a planar or tomographic mode, a device for reconstructing an image of a source of photons from interactions of photons, emitted by this source, the device including a microcomputer or an electronic circuit, the method comprising:
using a detector of a gamma-camera positioned behind a collimator;
using the microcomputer or an electronic circuit to associate with each interaction of photon, emitted by a source of photons, with the detector, a piece of information relating to the location in the detector of this interaction;
reconstructing an image of the source of photons from said information,
wherein the detector is broken down into several pixels, each pixel comprising several voxels, and wherein said microcomputer or said electronic circuit is configured to perform:
determining, for each received photon, the voxel of the detector in which the photon has interacted,
counting, for each voxel of the detector, the number of photons having interacted in this voxel, and defines for each voxel of the detector, a raw or differential statistical datum, a raw datum corresponding to the number of photons counted for the relevant voxel, a differential datum corresponding to a difference between numbers of counted photons, and
reconstructing images from said statistical data.

16. The method of claim 15, wherein each pixel is divided into several voxels for each collimator hole.

* * * * *